(12) United States Patent
Okumura

(10) Patent No.: US 9,869,924 B2
(45) Date of Patent: Jan. 16, 2018

(54) INTERFACE DEVICE AND CONTROL METHOD

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 328 days.

(21) Appl. No.: 14/770,891

(22) PCT Filed: Aug. 23, 2013

(86) PCT No.: PCT/JP2013/072586
§ 371 (c)(1),
(2) Date: Aug. 27, 2015

(87) PCT Pub. No.: WO2014/136292
PCT Pub. Date: Sep. 12, 2014

(65) Prior Publication Data
US 2016/0011493 A1    Jan. 14, 2016

(30) Foreign Application Priority Data
Mar. 4, 2013  (JP) ................................. 2013-041876

(51) Int. Cl.
*G03B 21/14* (2006.01)
*G03B 21/20* (2006.01)
(Continued)

(52) U.S. Cl.
CPC .......... *G03B 21/142* (2013.01); *G02B 27/18* (2013.01); *G02B 27/4205* (2013.01);
(Continued)

(58) Field of Classification Search
CPC .. G03B 21/14; G03B 21/142; G03B 21/2033; G03B 21/2046; G03B 21/2013;
(Continued)

(56) References Cited

U.S. PATENT DOCUMENTS 8,007,141 B2 * 8/2011 Matsubara ........... G02B 5/1809
359/558
8,960,927 B2 * 2/2015 Okamoto ................ H01S 3/005
353/85

(Continued)

FOREIGN PATENT DOCUMENTS

JP   04-201270 A    7/1992
JP   11-271515 A   10/1999
(Continued)

OTHER PUBLICATIONS

Pranav Mistry, "SixthSense", MIT Media Lab, cited in the Specification (2010).
(Continued)

*Primary Examiner* — William C Dowling

(57) ABSTRACT

A laser light application unit (2100) has a laser light source for applying laser light. A control information acquisition unit (2200) acquires control information indicating each of a plurality of directions in which an image is to be irradiated. A control unit (2300) controls an interface device (2000) such that the image is irradiated in each of the plurality of directions indicated by the control information. The laser light applied by the laser light application unit (2100) is incident on a first light collection unit (2400). The first light collection unit (2400) diffracts the incident laser light such that the laser light forms the image that is not similar to that at the time of incidence.

18 Claims, 31 Drawing Sheets

(51) Int. Cl.
*H04N 9/31* (2006.01)
*G02B 27/42* (2006.01)
*G02B 27/18* (2006.01)
*G02B 27/44* (2006.01)
*G03B 17/54* (2006.01)

(52) U.S. Cl.
CPC ............. *G02B 27/44* (2013.01); *G03B 17/54* (2013.01); *G03B 21/2013* (2013.01); *G03B 21/2033* (2013.01); *G03B 21/2046* (2013.01); *H04N 9/3161* (2013.01)

(58) Field of Classification Search
CPC ...... H04N 9/3161; H04N 9/31; H04N 9/3155; G02B 27/4205
See application file for complete search history.

(56) References Cited

U.S. PATENT DOCUMENTS

2016/0205363 A1* 7/2016 Okumura ............. H04N 9/3155 348/177
2017/0072843 A1* 3/2017 Lection ................... B60Q 1/50

FOREIGN PATENT DOCUMENTS

JP 2000-253347 A 9/2000
JP 2004-309650 A 11/2004

OTHER PUBLICATIONS

Hrvoje Benko, Scott Saponas, "Omnitouch", Microsoft, cited in the Specification (Oct. 17, 2011).
NEC Corporation, "Ambient Interface", Mobile World Congress 2012, cited in the Specification.
"Compact Projector GP-091 Manufactured by Shenzhen YSF", Jul. 2011, cited in the Specification.
"Compact Laser Projector Manufactured by Microvision", Jul. 6, 2011, cited in the Specification.
"Performance of Projector Used for Sixthsense", cited in the Specification (Jun. 11, 2010).
Kashiko Kodate, Takeshi Kamiya, "Numerical Analysis of Diffractive Optical Element and Application Thereof", Dec. 20, 2011, Maruzen Publishing Co., Ltd, pp. 1-31, cited in the Specification.
International Search Report for PCT Application No. PCT/JP2013/072586, dated Sep. 24, 2013.
English translation of Written opinion for PCT Application No. PCT/JP2013/072586.
Japanese Office Action for JP Application No. 2015-504113 dated Jun. 20, 2017 with English Translation.

* cited by examiner

Fig. 2
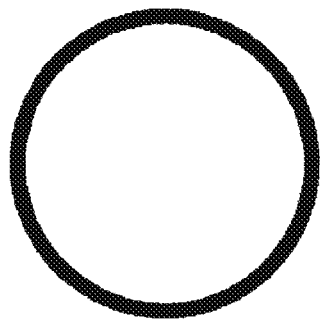
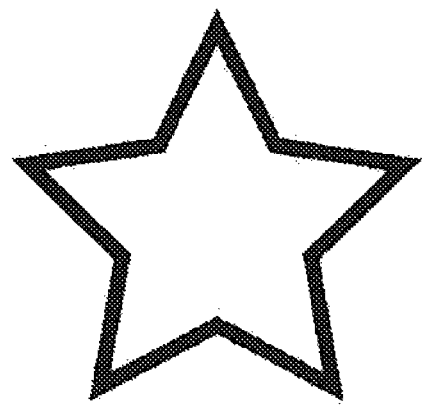
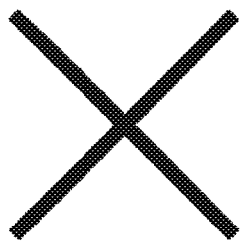

Fig. 3
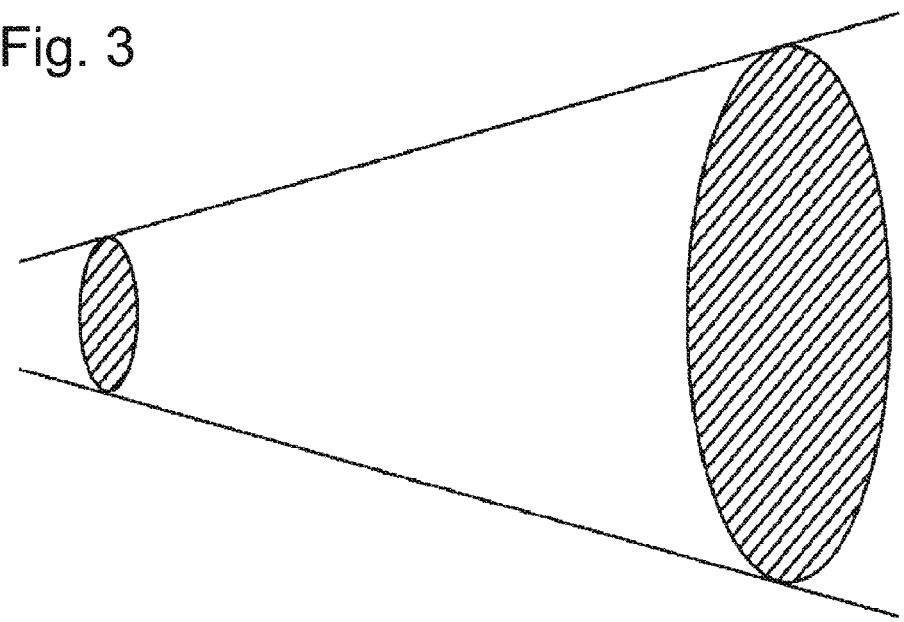
(a)
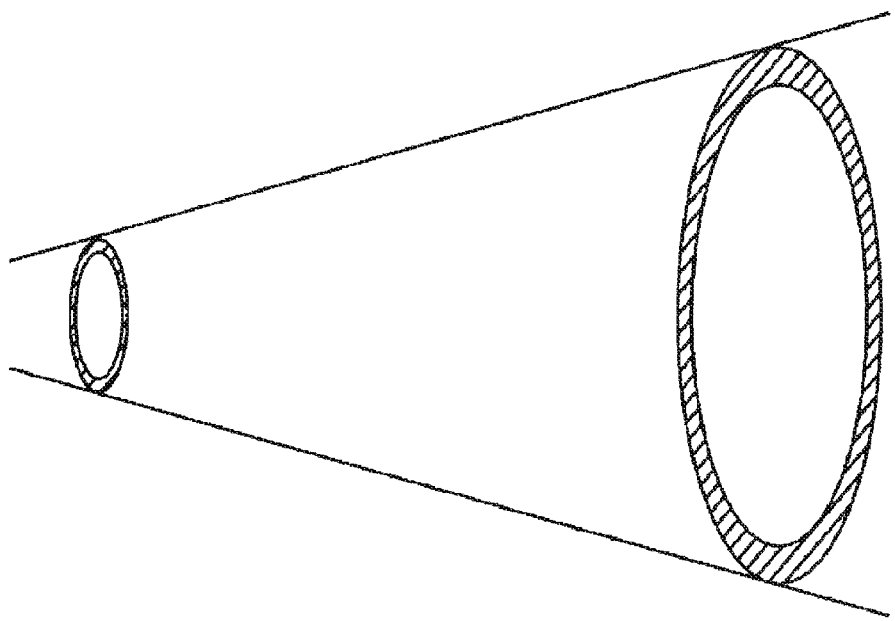
(b)

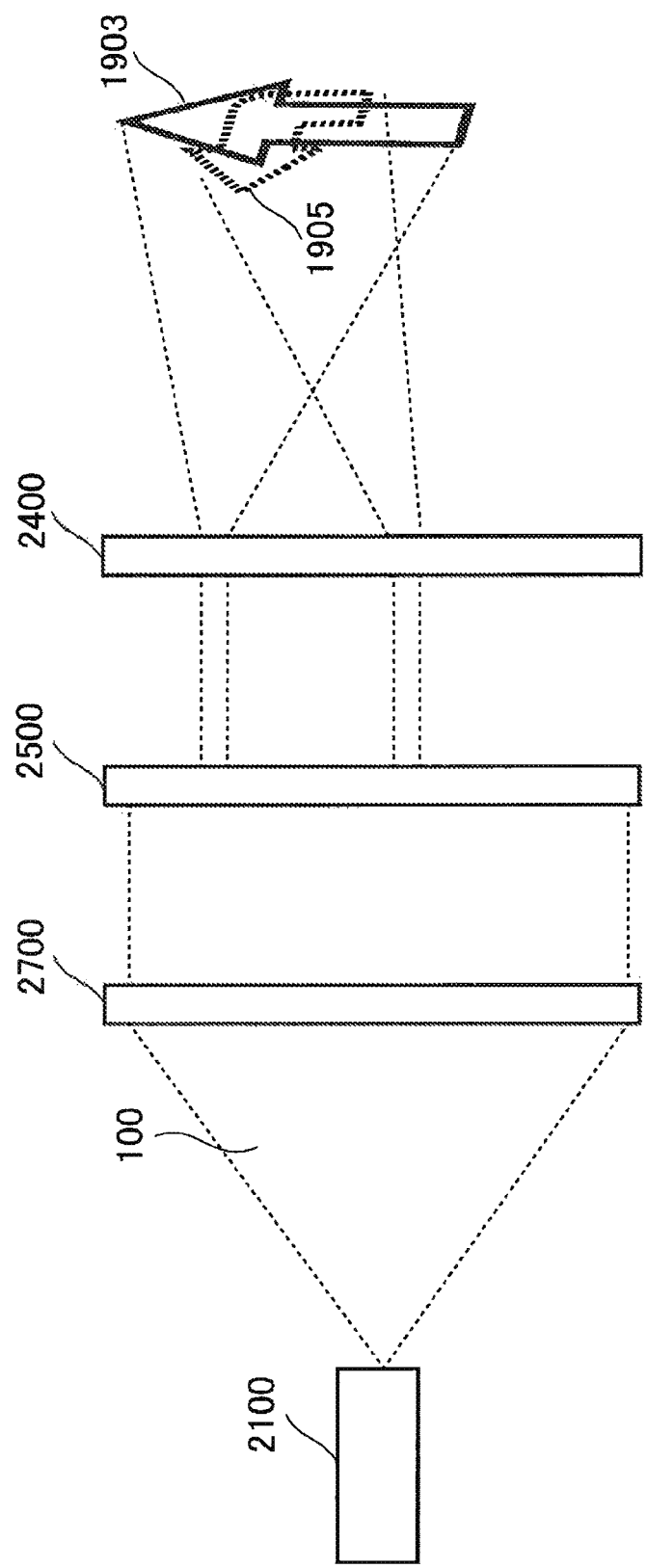

INTERFACE DEVICE AND CONTROL METHOD

DESCRIPTION

This application is a National Stage Entry of PCT/JP2013/072586 filed on Aug. 23, 2013, which claims priority from Japanese Patent Application 2013-041876 filed on Mar. 4, 2013, the contents of all of which are incorporated herein by reference, in their entirety.

TECHNICAL FIELD

The present invention relates to an interface device and a control method.

BACKGROUND ART

In recent years, interface devices in which an image recognition device, such as a camera, and a projector are combined have been developed. These interface devices read an object, and a gesture by a hand or a finger with the camera. Then, these interface devices perform identification and recognition of the object and recognition of the gesture by image processing, and provide information in accordance with the result by a picture image irradiated from the projector. In addition, these interface devices read and use, as input, the gesture by a hand or a finger with respect to the picture image irradiated from the projector. Examples of these interface devices include those described in Non Patent Literatures 1 to 3 (NPLs 1 to 3).

In an interface device as described above, a projector is an important component. In order to reduce the interface device in size and weight, the projector needs to be reduced in size and weight. At the present day, a compact and lightweight projector like this is called a picoprojector. Picoprojectors like this are disclosed in Non Patent Literatures 4 to 6 (NPLs 4 to 6).

Here, reducing the projector in size and weight and brightening output of the projector is a trade-off relationship. For example, in NPL 4, the brightness of output is in the highest category among picoprojectors, and the size is also in the biggest category among picoprojectors. Specifically, the projector has a volume of 160 cc and a weight of 200 g. The projector outputs a light flux of 33 lm by a 12 W LED light source. In contrast, a picoprojector described in NPL 5 is more reduced in size and weight compared to the projector described in NPL 4, but the brightness of output is about half of that of the projector described in NPL 4. Specifically, the projector described in NPL 5 has a volume of 100 cc, a weight of 112 g, a power consumption of 4.5 W, and a brightness of 15 lm.

CITATION LIST

Non Patent Literature

[NPL 1] Pranav Mistry, "SixthSense", MIT Media Lab, [Searched on Feb. 4, 2013], Internet (URL:http://www.pranavmistry.com/projects/sixthsense)

[NPL 2] Hrvoje Benko, Scott Saponas, "Omnitouch", Microsoft, [Searched on Feb. 4, 2013], Internet (URL: http://research.microsoft.com/en-us/news/features/touch-101711.aspx) [NPL 3] NEC, Mobile World Congress 2012, [Searched on Feb. 4, 2013], Internet (URL: http://www.nec.com/en/event/mwc/movie.html)

[NPL 4] "Compact Projector GP-091 Manufactured by Shenzhen YSF", [Searched on Feb. 4, 2013], Internet (URL:http://trade.e-to-china.com/product-p1A6DEA1/Mini_led_Lcos_projector_GP_091_Portable_home_theater_Projector.html)

[NPL 5] "Compact Laser Projector Manufactured by Microvision", [Searched on Feb. 4, 2013], Internet (URL: http://www.itmedia.co.jp/lifestyle/articles/1107/06/news098.html)

[NPL 6] "Performance of Projector Used for Sixthsense", [Searched on Feb. 4, 2013], Internet (URL:http://www.picopros.com/article/sixthsense-technology-using-microvision-picop%C2% AE-technology)

[NPL 7] Kashiko Kodate, Takeshi Kamiya, "Numerical Analysis of Diffractive Optical Element and Application Thereof", MARUZEN PUBLISHING CO., LTD

SUMMARY OF INVENTION

Technical Problem

The present inventor studied a method for displaying bright images on a plurality of places, in a compact and lightweight projector. As described above, at the present day, in a projector, reducing size and weight and brightening output is a trade-off relationship. A current picoprojector can only be used at a close range and in a place where strength of environmental light is weak because output is darkened so as to reduce size and weight.

However, a range of use of the above-described interface device is not limited to a close range. The interface device like this is sometimes wanted to be used for displaying information on an object a short distance away, or for displaying a picture image on a table. However, when an existing projector is used in a situation where an irradiation distance is long in this manner, output by the projector is dark, and thus, it is difficult to see the displayed information.

Here, by narrowing down an irradiation direction of an image by a projector, a device described in NPL 3 can brighten an image to be displayed. However, narrowing down of the irradiation direction of the image makes it impossible to display images in a plurality of directions at the same time.

The present invention has been made in view of the above-described problem. An object of the present invention is to provide a technique that is capable of irradiating bright images in a plurality of directions at the same time, in a compact and lightweight projector.

Solution to Problem

An interface device that the present invention provides includes: a laser light application means having a laser light source for applying laser light; a control information acquisition means for acquiring control information that is information indicating each of a plurality of directions in which an image is to be irradiated; a control means for controlling a direction in which the image is irradiated on the basis of the control information; and a first light collection means, on which the laser light is incident, for diffracting the laser light such that the laser light forms the image that is not similar to that at the time of incidence.

A control method that the present invention provides is executed by a computer for controlling an interface device. The interface device includes: a laser light application means having a laser light source for applying laser light; and a first light collection means, on which the laser light is incident, for diffracting the laser light such that the laser light forms an image that is not similar to that at the time of incidence. The control method includes: a control information acquisition step for acquiring control information that is information indicating each of a plurality of directions in which the image is to be irradiated; and a control step for controlling a direction in which the image is irradiated on the basis of the control information.

Advantageous Effects of Invention

According to the present invention, a technique that is capable of irradiating bright images in a plurality of directions at the same time, in a compact and lightweight projector, is provided.

BRIEF DESCRIPTION OF DRAWINGS

The above-described object, other objects, features, and advantages will be further apparent from preferred exemplary embodiments described below and the accompanying drawings as follows.

FIG. 2 is a diagram exemplifying an image that laser light diffracted by a first light collection unit forms.

FIG. 3 is a diagram illustrating a state where laser light emitted by each of an existing projector and an interface device diffuses.

FIG. 31 is a diagram further describing an interface device in Example 6.

DESCRIPTION OF EMBODIMENTS

Figure 1:
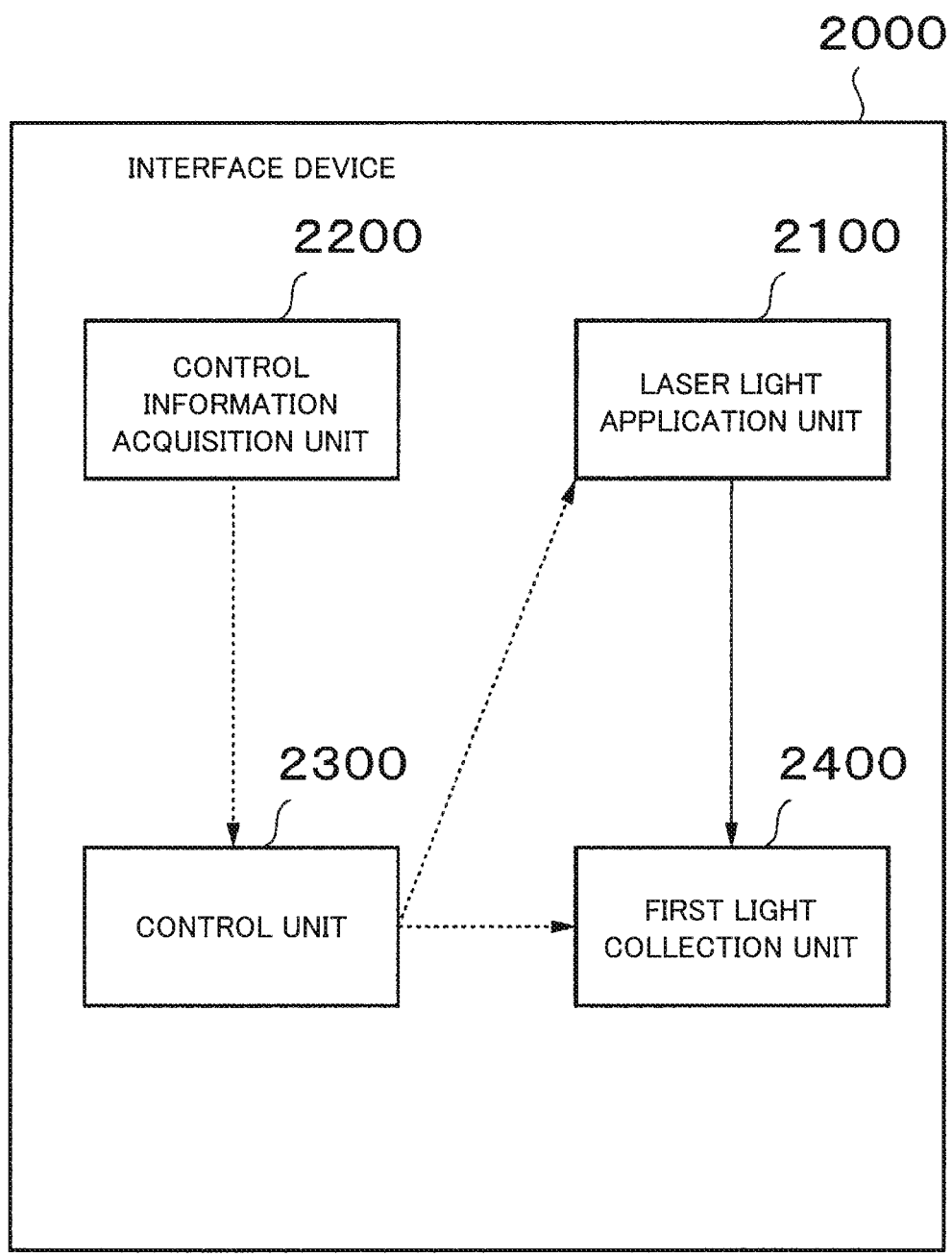
FIG. 1 is a block diagram illustrating an interface device of Exemplary Embodiment 1.

Hereinafter, exemplary embodiments of the present invention will be described using drawings. It is to be noted that, in all drawings, the same components are denoted by the same reference numerals, and the description is appropriately omitted.

It is to be noted that, in the following description, each component of each device indicates a block of a functional unit rather than a configuration of a hardware unit. Each component of each device is achieved by an arbitrary combination of hardware and software focusing on a CPU, a memory, a program loaded on the memory, which achieves components of the present drawings, a storage media such as a hard disk, which stores the program, and an interface for network connection of an arbitrary computer. There are various modifications in the achievement method and devices thereof.

[Exemplary Embodiment 1]

FIG. 1 is a block diagram illustrating an interface device 2000 of Exemplary Embodiment 1. In FIG. 1, each block indicates a configuration of a functional unit rather than a configuration of a hardware unit. In FIG. 1, a solid arrow indicates a flow of laser light, and a dotted arrow indicates a flow of information.

The interface device 2000 has a laser light application unit 2100, a control information acquisition unit 2200, a control unit 2300, and a first light collection unit 2400. Hereinafter, each of the components will be described.

<Laser Light Application Unit 2100>

The laser light application unit 2100 has a laser light source for applying laser light.

<Control Information Acquisition Unit 2200>

The control information acquisition unit 2200 acquires control information. The control information is information indicating each of a plurality of directions in which the interface device 2000 is to irradiate an image.

<Control Unit 2300>

The control unit 2300 controls the interface device 2000 such that the image is irradiated from the interface device 2000 in each of the plurality of directions indicated by the control information.

<First Light Collection Unit 2400>

The laser light applied by the laser light application unit 2100 is incident on the first light collection unit 2400. Then, the first light collection unit 2400 diffracts the laser light such that the laser light forms the image that is not similar to that at the time of incidence.

FIG. 2 is a diagram exemplifying the image that the laser light diffracted by the first light collection unit 2400 forms. The image formed by the laser light applied from the first light collection unit 2400 is a hollow graphic, for example. In addition, the image formed by the laser light applied from the first light collection unit 2400 is a linear graphic, for example. In addition, the image formed by the laser light applied from the first light collection unit 2400 is a combination of a hollow graphic and a linear graphic (example: character and the like), for example. Therefore, according to the interface device 2000, unlike an existing projector in which applied laser light uniformly diffuses, a light flux of the laser light diffuses in a partially aggregated state, and thus, a bright image is irradiated with respect to a distant object.

A difference between an image that laser light applied by an existing projector forms and an image that laser light applied by the interface device 2000 forms will be described using FIG. 3. FIG. 3 is a diagram illustrating a state where the laser light applied by each of the existing projector and the interface device 2000 diffuses. In the drawing, a shaded part is a part where light exists. FIG. 3(a) illustrates a state where the laser light applied by the existing projector diffuses. In the case of a usual projector, an image that laser light forms is a circle, a quadrangle, or the like, and the light uniformly exists so as to fill the inside of the image. The applied light diffuses in a state where the light uniformly exists inside the image.

In contrast, FIG. 3(b) illustrates a state where the laser light applied by the interface device 2000 of the present exemplary embodiment diffuses. As illustrated in FIG. 3(b), the laser light applied by the interface device 2000 is diffracted by the first light collection unit 2400 to form an image such as a hollow circle. Therefore, the laser light applied from the interface device 2000 diffuses in a state where a light flux is aggregated in a narrower region than the case of FIG. 3(a). As a result, in the case of the interface device 2000, the density of the light flux of the light that forms the image becomes larger than the case of the existing projector. Therefore, in the case of the interface device 2000, the image formed by the applied laser light becomes brighter than the case of the existing projector.

The first light collection unit 2400 is a diffractive optical element obtained by providing fine irregularities at a wavelength level on a surface of a transparent material, for example. The diffractive optical element diffracts the incident laser light such that the laser light forms the image exemplified in FIG. 2. By diffracting the laser light with the diffractive optical element like this, in theory, any image can be formed. The diffractive optical element like this is described in detail in NPL 7, for example. Thus, the description is omitted here.

<Processing Flow>

Figure 4:
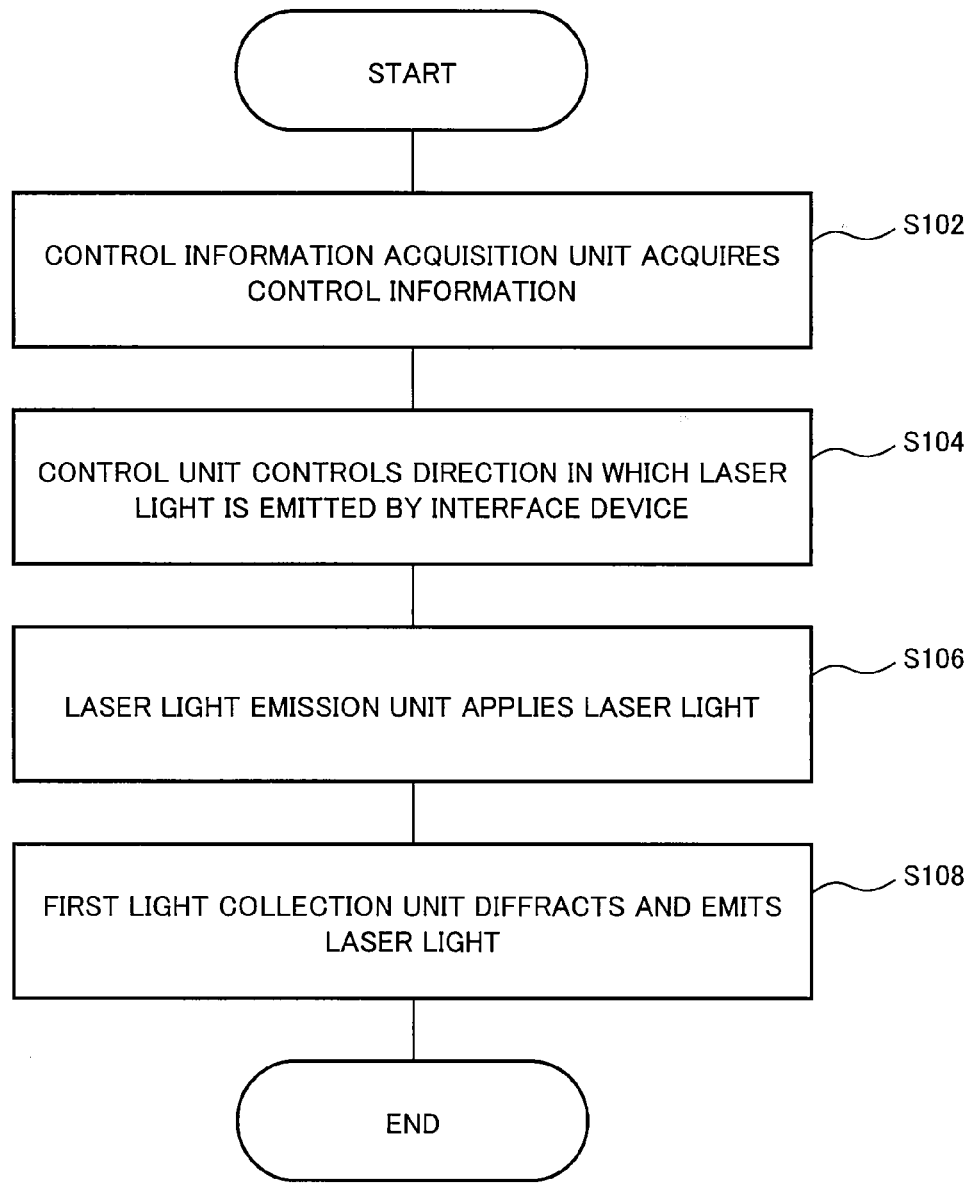
FIG. 4 is a flow chart exemplifying a flow of an operation by the interface device of Exemplary Embodiment 1.

FIG. 4 is a flow chart exemplifying a flow of an operation by the interface device 2000 of Exemplary Embodiment 1.

In Step S102, the control information acquisition unit 2200 acquires control information. In Step S104, the control unit 2300 controls a direction in which laser light is applied from the interface device 2000 on the basis of the control information. In Step S106, the laser light application unit 2100 applies laser light. In Step S108, the first light collection unit 2400 diffracts and applies the incident laser light.

It is to be noted that the flow of the operation by the interface device 2000 is not limited to the above-described flow. For example, after the laser light application unit 2100 applies the laser light, the control by the control unit 2300 may be performed.

<Operation and Effect>

According to the interface device 2000 of the present exemplary embodiment, by diffracting the laser light applied from the laser light application unit 2100 with the first light collection unit 2400, the image is irradiated. Here, the first light collection unit 2400 diffracts the laser light such that the laser light forms the image that is not similar to that at the time of incidence. As a result, in the case of the interface device 2000, the density of the light of the image formed by the applied laser light becomes larger than the existing projector. Therefore, in the case of the interface device 2000, the image formed by the applied laser light becomes brighter than the existing projector.

For example, in the case of Class 2 laser that is permitted by law in Japan, the output of the laser is small, a mere 1 mW. Thus, for example, in the case of green laser light, the light flux is about 0.68 lm. However, when this is applied in a 1 cm square area, the illuminance becomes 6800 lx. The interface device 2000 applies the laser light such that the laser light is focused on one region in this manner, and thus, the image irradiated by the interface device 2000 is bright.

Furthermore, the control unit 2300 controls the interface device 2000 such that the laser light is applied in the plurality of directions indicated by the control information that the control information acquisition unit 2200 acquires. Therefore, according to the interface device 2000, the laser light can be applied in each of the plurality of directions.

Furthermore, the interface device 2000 has a simple configuration, and thus, can be reduced in size and weight.

In addition, when the interface device 2000 displays a relatively simple image illustrated in FIG. 2, the laser light application unit 2100 needs to have only a monochromatic laser light source. Thus, the power consumption is low.

In addition, unlike the existing projector that displays a screen image or the like, the interface device 2000 of the present exemplary embodiment irradiates the image illustrated in FIG. 2. Here, generally, the existing projector that displays a screen image or the like converts a beam shape having a substantially circle shape, which is applied from a laser light source, into a rectangle so as to adapt a planar shape of laser light to a shape of pixels configuring a picture image. During the conversion, the strength of the laser light decreases. In some cases, the strength of the laser light decreases by 20 to 30% by the conversion.

In contrast, the interface device 2000 irradiates the image illustrated in FIG. 2, and thus, needs not to convert a beam shape like the existing projector. Therefore, according to the interface device 2000, the strength decrease of the laser light inside the device is smaller compared to the existing projector. However, the interface device 2000 may have a configuration for converting the laser light outputted from the laser light application unit 2100 into a rectangle.

It is to be noted that the interface device 2000 applies the laser light, and thus, focusing is unnecessary. Therefore, the interface device 2000 is suitably applied to a mobile device, for example.

[Exemplary Embodiment 2]

Figure 5:
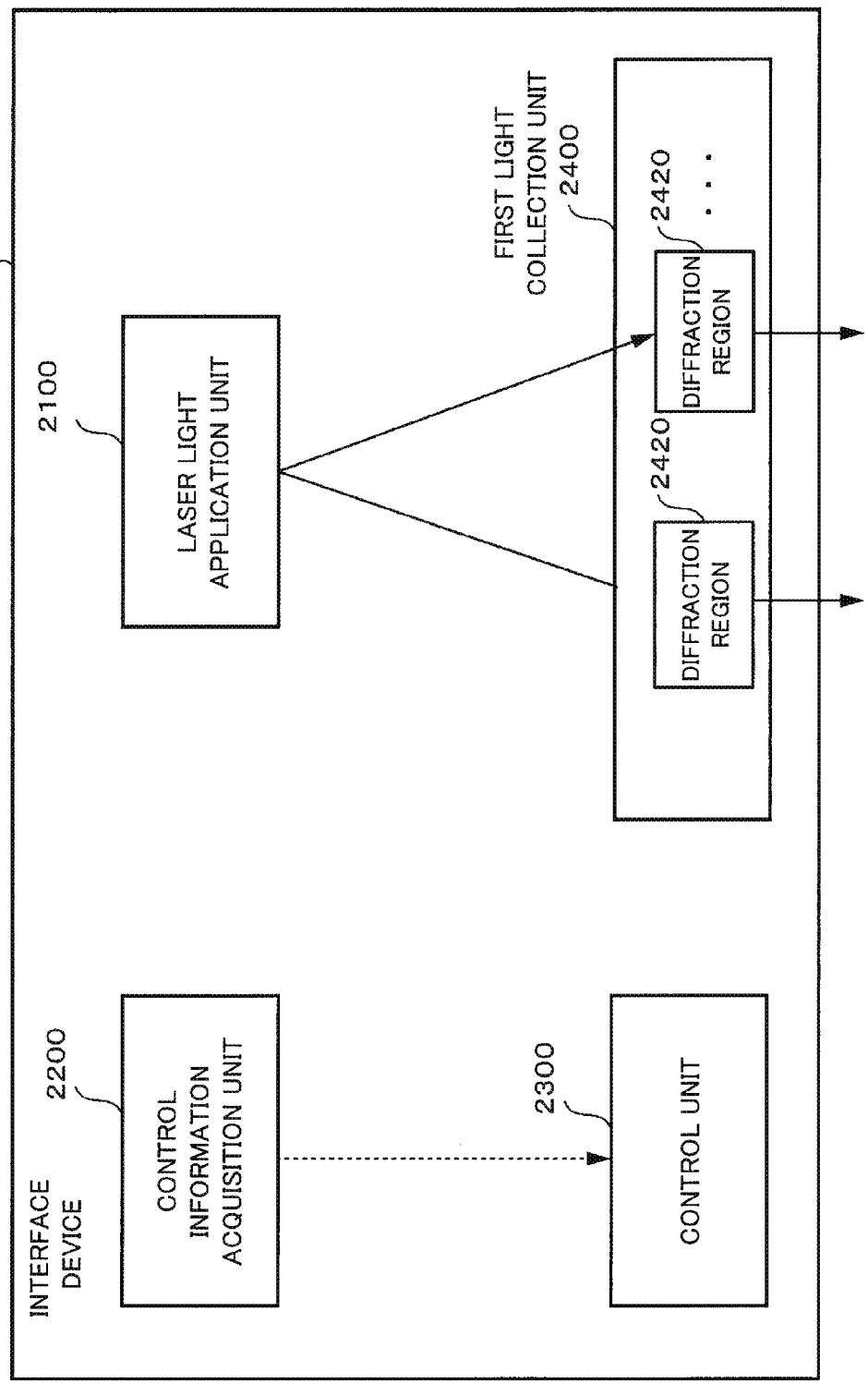
FIG. 5 is a block diagram illustrating an interface device of Exemplary Embodiment 2.

FIG. 5 is a block diagram illustrating the interface device 2000 of Exemplary Embodiment 2. In FIG. 5, each block indicates a configuration of a functional unit rather than a configuration of a hardware unit. In FIG. 5, a solid arrow indicates a flow of laser light, and a dotted arrow indicates a flow of information.

<First Light Collection Unit 2400>

In Exemplary Embodiment 2, the first light collection unit 2400 has a plurality of diffraction regions 2420. The laser light is incident on the respective plurality of diffraction regions 2420. The respective diffraction regions 2420 diffract the laser light such that the laser light forms the images that are independent on each other.

<Control Information Acquisition Unit 2200>

The control information that the control information acquisition unit 2200 acquires indicates the diffraction region 2420 on which the laser light is to be incident.

<Control Unit 2300>

The control unit 2300 controls the interface device 2000 such that the laser light is incident on the diffraction region 2420 indicated by the control information. Since the direction in which the image is irradiated is determined by which diffraction region 2420 the laser light is incident on, the laser light is incident on the diffraction region 2420 indicated by the control information so that the interface device 2000 can project the image in a desired direction.

Figure 6:
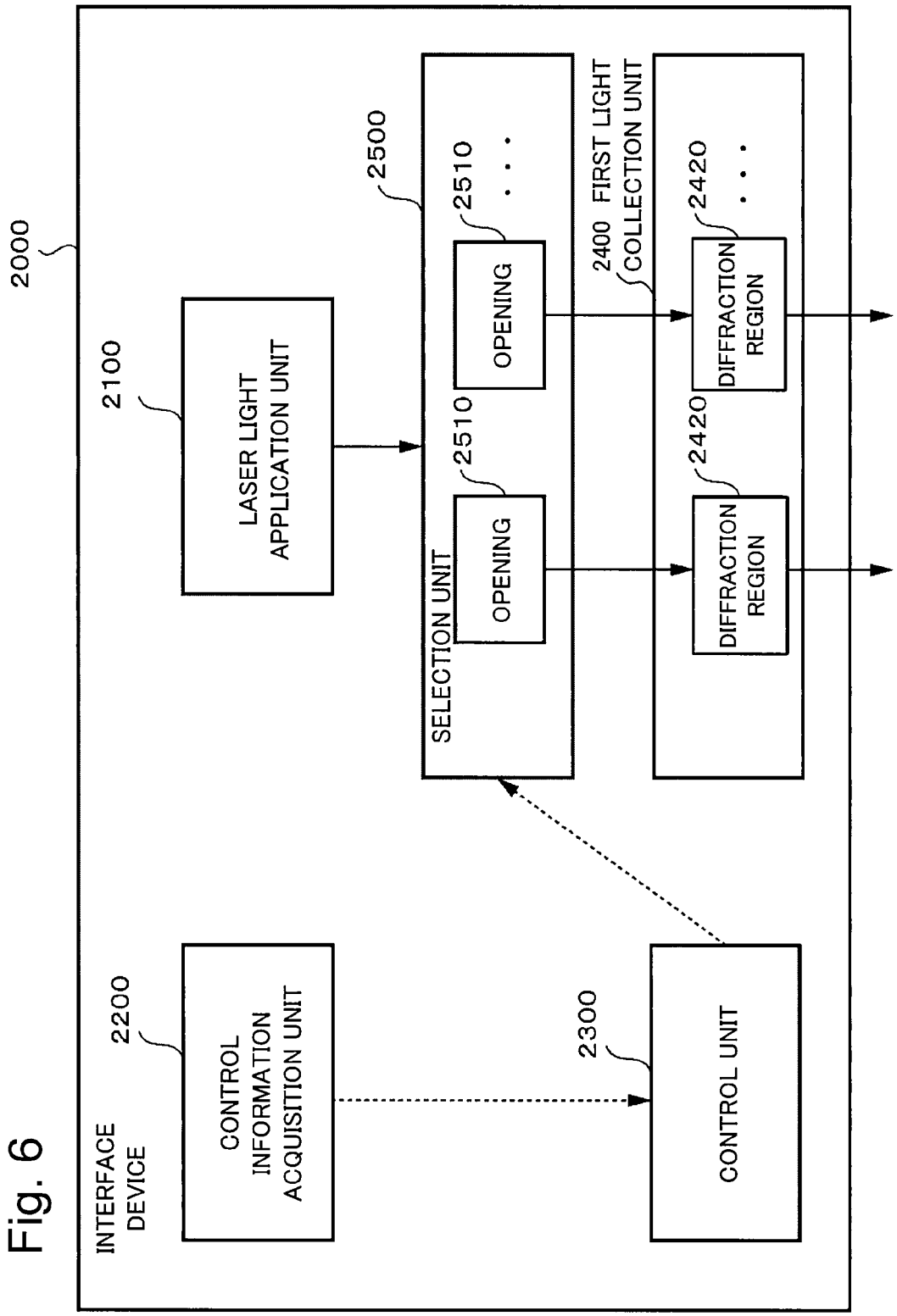
FIG. 6 is a block diagram exemplifying a specific configuration of the interface device of Exemplary Embodiment 2.

For example, a specific configuration of the interface device 2000 of Exemplary Embodiment 2 is a configuration illustrated in FIG. 6. Hereinafter, a detailed description will be provided.

<Selection Unit 2500>

The interface device 2000 illustrated in FIG. 6 has a selection unit 2500. The selection unit 2500 has a plurality of apertures 2510. A part of the laser light applied by the laser light application unit 2100 is incident on the respective apertures 2510, and the respective apertures 2510 perform filtering of the incident laser light. Here, "perform filtering" means that any of emitting and blocking the incident laser light is selectively performed. Beams of laser light that the respective apertures 2510 emit are incident on the diffraction regions 2420 different from each other. Here, the beam of laser light that the aperture 2510 has emitted is referred to as a beam of partial laser light. The diffraction region 2420 diffracts the incident beam of partial laser light.

The selection unit 2500 is a two-dimensional modulation element, for example. The two-dimensional modulation element is, for example, a transmissive liquid crystal panel, reflective liquid crystal, Digital Micromirror Device (DMD), or the like.

The laser light applied by the laser light application unit 2100 is incident on all of the apertures 2510. For example, in the interface device 2000, an application angle of the laser light by the laser light application unit 2100 and distances between the laser light application unit 2100 and the apertures 2510 are designed such that the laser light applied from the laser light application unit 2100 is incident on all of the apertures 2510. In addition, for example, the interface device 2000 may have an optical element for changing a diffusion angle of the laser light such that the laser light applied by the laser light application unit 2100 is incident on all of the apertures 2510. In addition, the optical element may be embedded inside the laser light application unit 2100.

Figure 7:
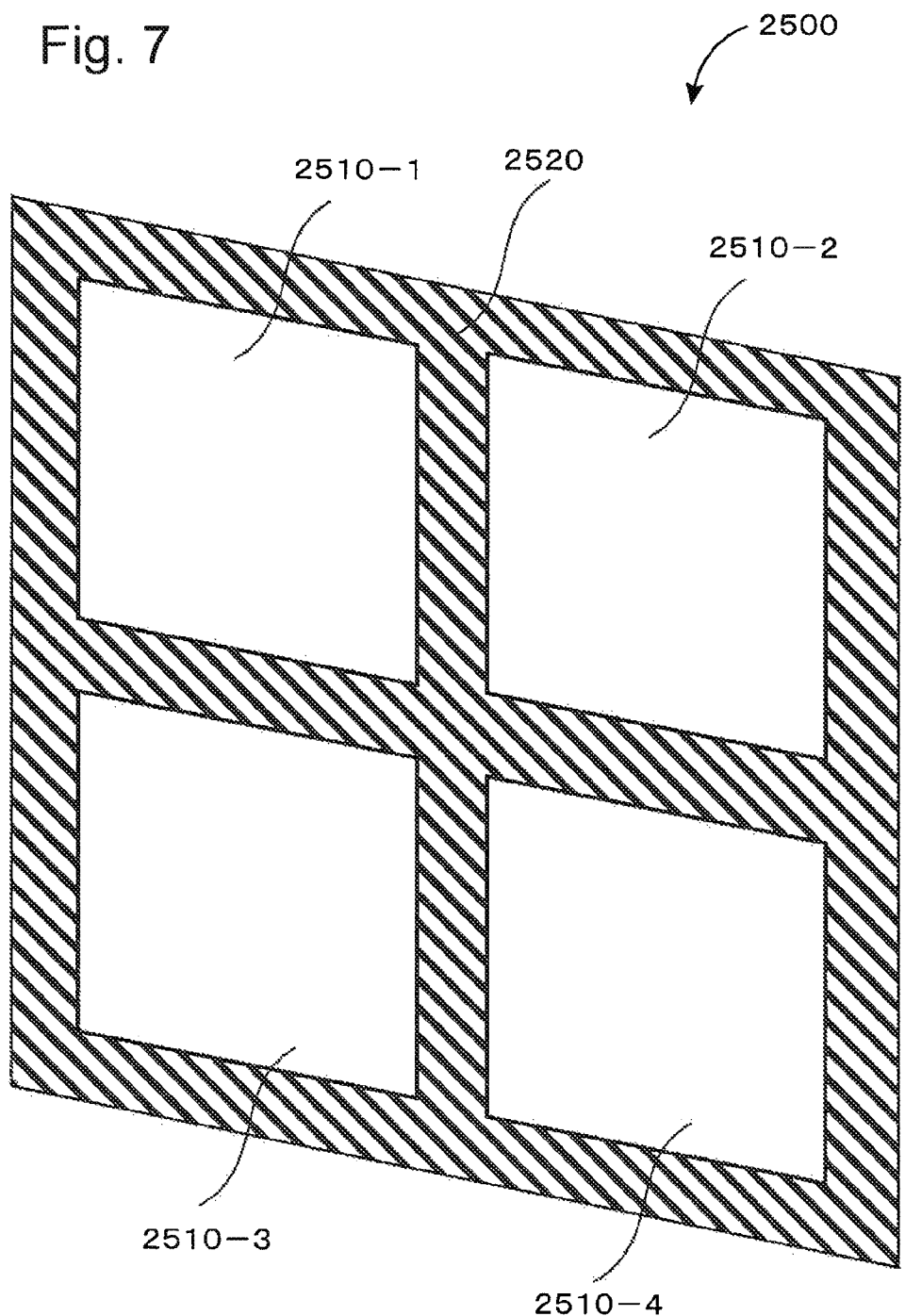
FIG. 7 is a diagram exemplifying a configuration of a selection unit.

FIG. 7 is a diagram exemplifying a configuration of the selection unit 2500. In FIG. 7, the selection unit 2500 is a grid-like liquid crystal panel. In FIG. 7, the selection unit 2500 has apertures 2510-1 to 4. The control unit 2300 controls the selection unit 2500 such that the partial laser light is applied from the selection unit 2500 with respect to the diffraction region 2420 that applies the laser light in the direction that the control information indicates. Specifically, the control unit 2300 sets whether or not each of the apertures 2510-1 to 4 emits the laser light. In addition, in FIG. 7, a black matrix 2520 is a frame provided for the purpose of preventing light leakage between pixels to improve contrast.

<Control Unit 2300>

The control unit 2300 controls the selection unit 2500 such that the aperture 2510 that emits the partial laser light with respect to the diffraction region 2420 indicated by the control information emits the partial laser light. In this case, for example, the interface device 2000 further acquires relation information that relates the diffraction region 2420 to the aperture 2510 that emits the laser light to the diffraction region 2420. It is to be noted that the relation information may be stored inside the interface device 2000, or may be stored outside the interface device 2000.

In addition, by indicating the aperture 2510 that is to emit the partial laser light, the control information may indicate the diffraction region 2420 on which the laser light is to be incident. In this case, the control unit 2300 controls the selection unit 2500 such that the aperture 2510 indicated by the control information emits the partial laser light.

Figure 8:
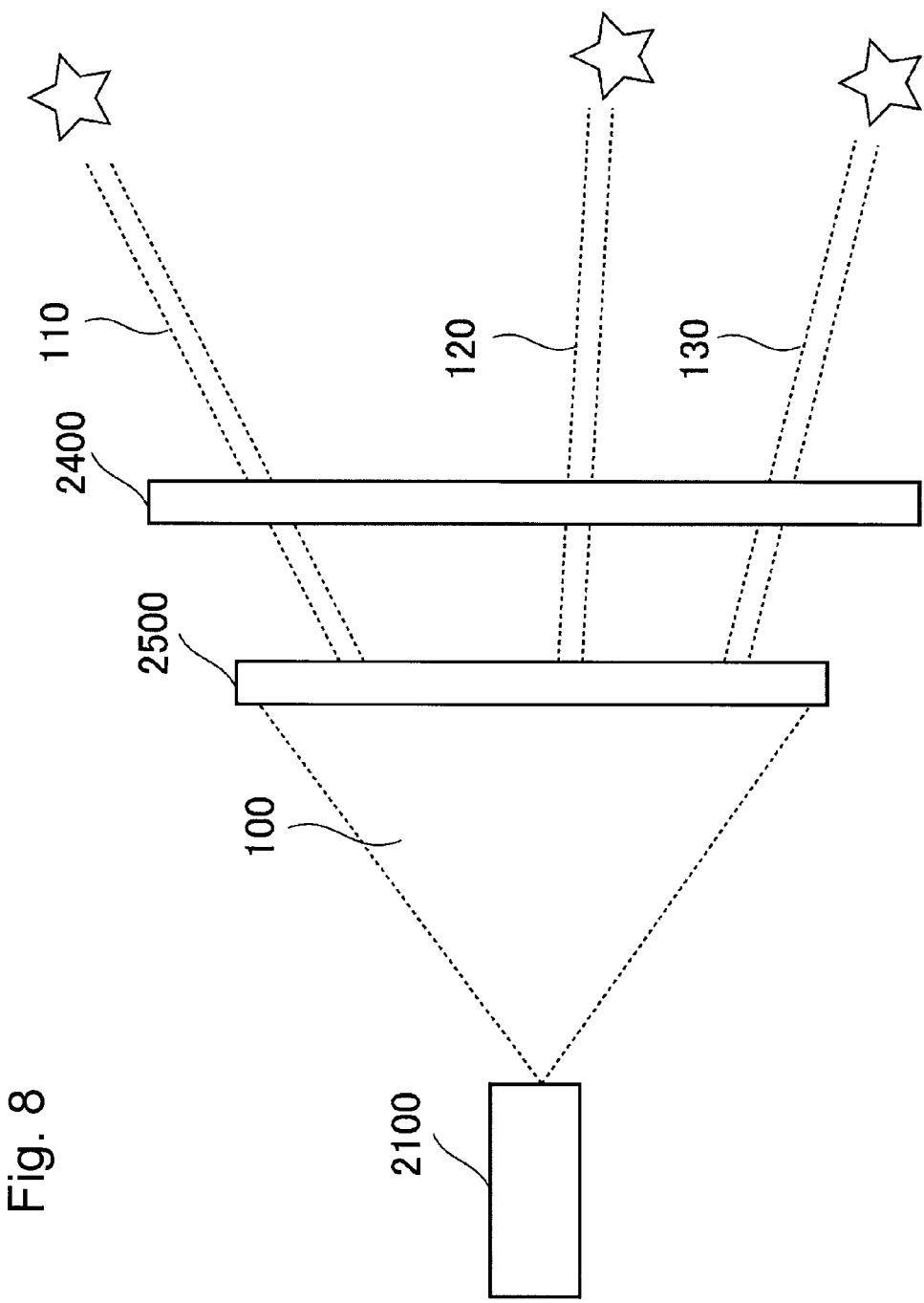
FIG. 8 is a diagram illustrating a state where laser light is emitted by the interface device of Exemplary Embodiment 2.

A flow of image irradiation by the interface device 2000 of Exemplary Embodiment 2 will be described using FIG. 8. In FIG. 8, a dotted line indicates laser light. Laser light 100 applied from the laser light application unit 2100 is incident on the selection unit 2500. Here, the selection unit 2500 is controlled by the control unit 2300 on the basis of the control information. Accordingly, in the selection unit 2500, a part of the apertures 2510 emits the laser light and the remaining apertures 2510 block the laser light. Accordingly, beams of partial laser light 110, 120, and 130 are formed. Then, each of the beams of partial laser light 110 to 130 is incident on the diffraction region 2420 and is diffracted by the diffraction region 2420. Each of the beams of partial laser light 110 to 130 diffracted by the diffraction region 2420 is applied in any of the directions indicated by the control information. Here, a star sign in FIG. 8 is an image formed by each of the beams of partial laser light 110 to 130 which has passed through the diffraction region 2420.

It is to be noted that, in FIG. 8, a gap is provided between the selection unit 2500 and the first light collection unit 2400. However, this is a gap provided for making the drawing more visible, and the gap is unnecessary when mounting the interface device 2000.

<Operation and Effect>

According to the interface device 2000 of Exemplary Embodiment 2, the direction in which the image is irradiated can be controlled by a simple method that controls which diffraction region 2420 the laser light is incident on. For example, by selecting the aperture 2510 through which the laser light is made to pass, the interface device 2000 selects the diffraction region 2420 through which the laser light is made to pass. The control unit 2300 that performs simple control in this manner can be mounted by a simple mechanism. In addition, as described above, the first light collection unit 2400 and the selection unit 2500 can be closely mounted. Consequently, the interface device 2000 can be reduced in size and weight. In addition, since the control unit 2300 can be mounted by a simple mechanism, the interface device 2000 has low power consumption.

[Exemplary Embodiment 3]

Figure 9:
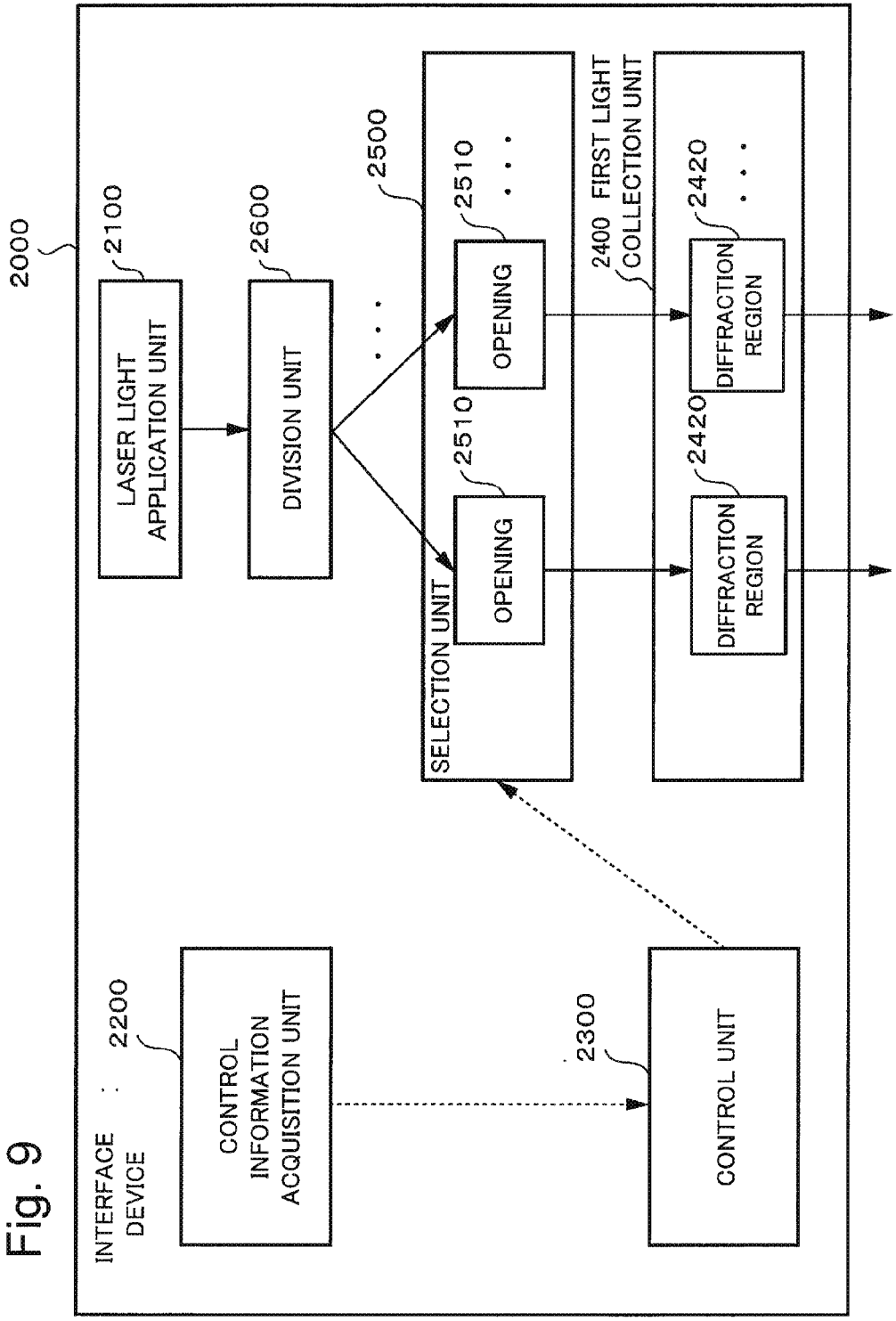
FIG. 9 is a block diagram illustrating an interface device of Exemplary Embodiment 3.

FIG. 9 is a block diagram illustrating the interface device 2000 of Exemplary Embodiment 3. In FIG. 9, each block indicates a configuration of a functional unit rather than a configuration of a hardware unit. In FIG. 9, a solid arrow indicates a flow of laser light, and a dotted arrow indicates a flow of information.

In the interface device 2000 of Exemplary Embodiment 2, the laser light that has been incident on the region other than the apertures 2510 in the region that the selection unit 2500 has does not pass through the selection unit 2500. For example, in the liquid crystal panel illustrated in FIG. 7, the black matrix 2520 is provided for preventing light leakage between pixels to improve contrast. The laser light that has been incident on the black matrix 2520 cannot pass through the selection unit 2500 to cause loss. In addition, the laser light diffracts at the edge part of the black matrix 2520, and the light travels in a direction different from the original traveling direction, that is, stray light occurs. By the occurrence of such stray light, the strength of the laser light decreases.

For this reason, the interface device 2000 of Exemplary Embodiment 3 has a division unit 2600. The division unit 2600 divides the laser light applied from the laser light application unit 2100 to form a plurality of beams of partial laser light such that the laser light that is incident on the selection unit 2500 is incident on only the respective apertures 2510. The respective beams of partial laser light are incident on the apertures 2510 different from each other. Accordingly, the loss due to the incidence of the laser light on the part other than the apertures 2510 of the region that the selection unit 2500 has can be prevented. The division unit 2600 is a diffractive optical element, for example.

Figure 10:
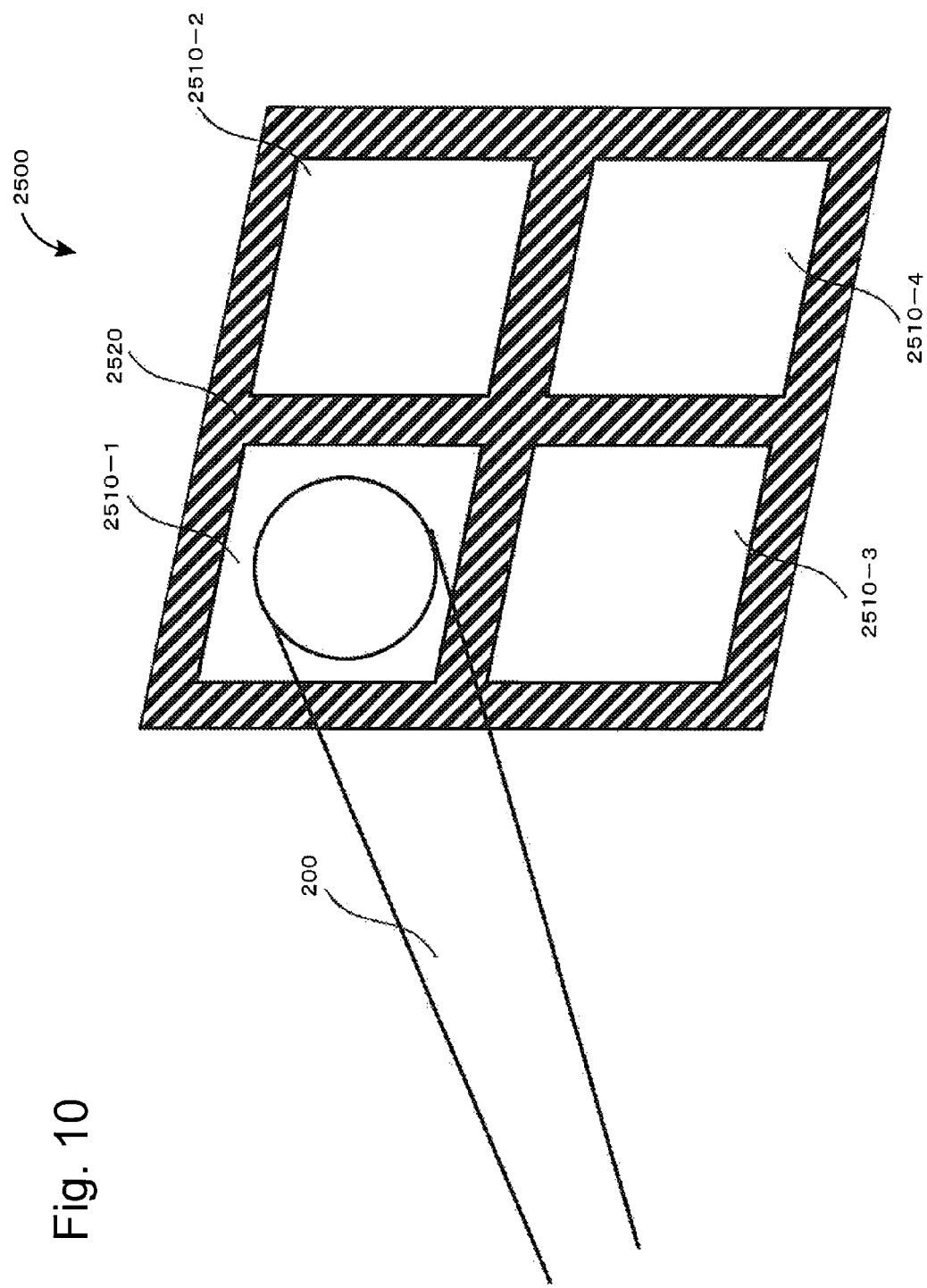
FIG. 10 is a diagram illustrating a state where partial laser light divided by a division unit is incident on the selection unit.

FIG. 10 is a diagram illustrating a state where partial laser light 200 divided by the division unit 2600 is incident on the selection unit 2500. The partial laser light 200 is not incident on the black matrix 2520 and is incident on the aperture 2510-1. Thus, the loss of the laser light due to the incidence of the laser light on the black matrix 2520 does not occur. It is to be noted that, in FIG. 10, in order to prevent the drawing from being complex, only the partial laser light 200 that is incident on the aperture 2510-1 is illustrated. In fact, beams of the partial laser light 200 different from each other are incident on the aperture 2510-2, the aperture 2510-3, and the aperture 2510-4.

Figure 11:
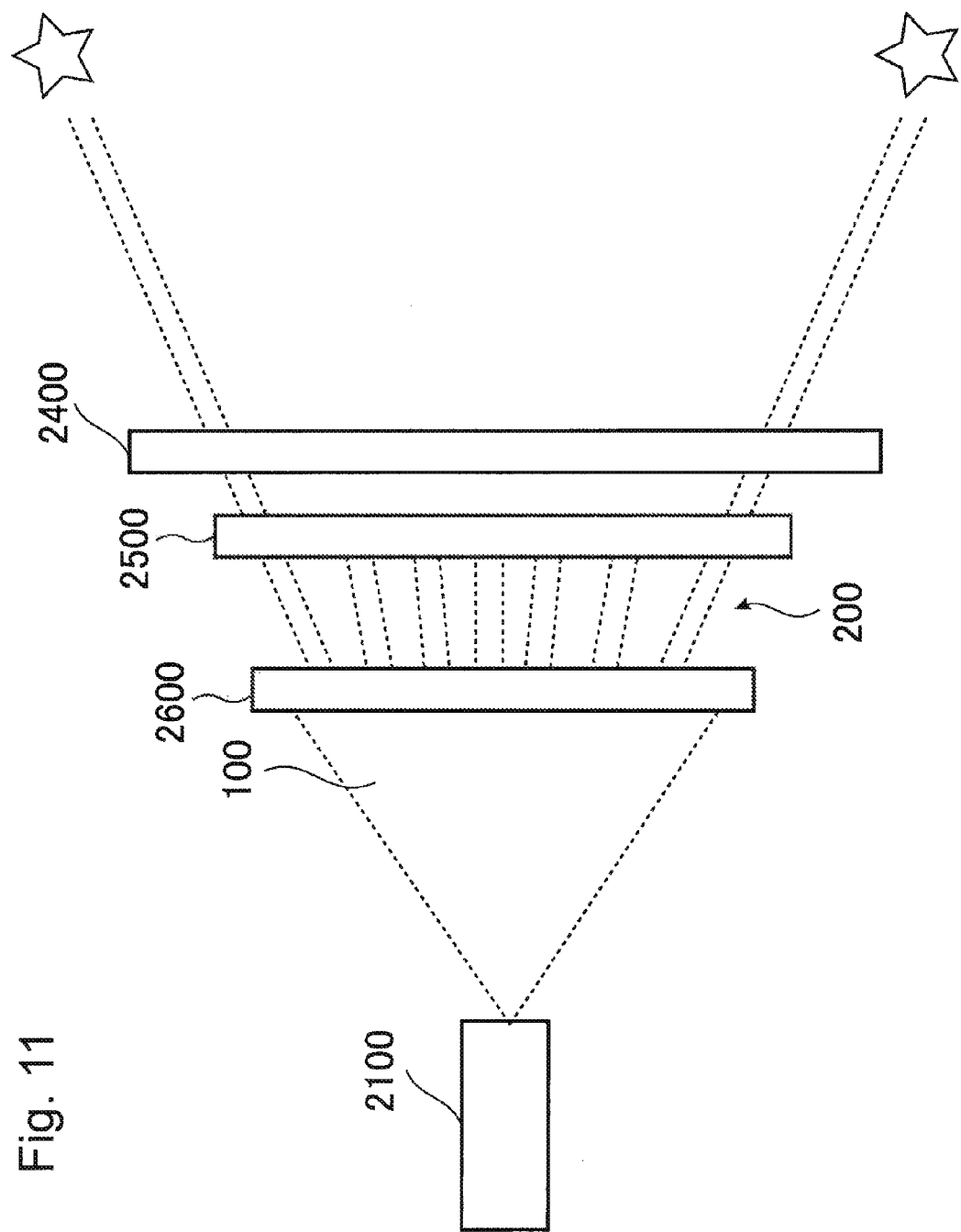
FIG. 11 is a diagram illustrating a state where laser light is emitted by the interface device of Exemplary Embodiment 3.

FIG. 11 is a diagram illustrating a state where the image is irradiated by the interface device 2000 of Exemplary Embodiment 3. In FIG. 11, a dotted line indicates laser light. The laser light 100 applied by the laser light application unit 2100 is divided by the division unit 2600. As a result, the plurality of beams of partial laser light 200 are formed. Then, the plurality of beams of partial laser light 200 are incident on the selection unit 2500. The selection unit 2500 emits a part of the beams of partial laser light 200 and blocks the remaining beams of partial laser light 200. The beams of partial laser light 200 emitted from the selection unit 2500 are processed in the same manner as the interface device 2000 of Exemplary Embodiment 2 described using FIG. 8.

<Operation and Effect>

According to the interface device 2000 of Exemplary Embodiment 3, the laser light applied from the laser light application unit 2100 is incident on only the apertures 2510 in the region that the selection unit 2500 has. Accordingly, the loss due to the incidence of the laser light on the region through which the laser light cannot be made to pass does not occur. In addition, the occurrence of the stray light at a boundary between the apertures 2510 and a region other than the apertures 2510 can be prevented. Therefore, according to the interface device 2000 of Exemplary Embodiment 3, the decrease in the strength of the laser light can be prevented, and thus, the image irradiated by the interface device 2000 becomes brighter.

[Exemplary Embodiment 4]

Figure 12:
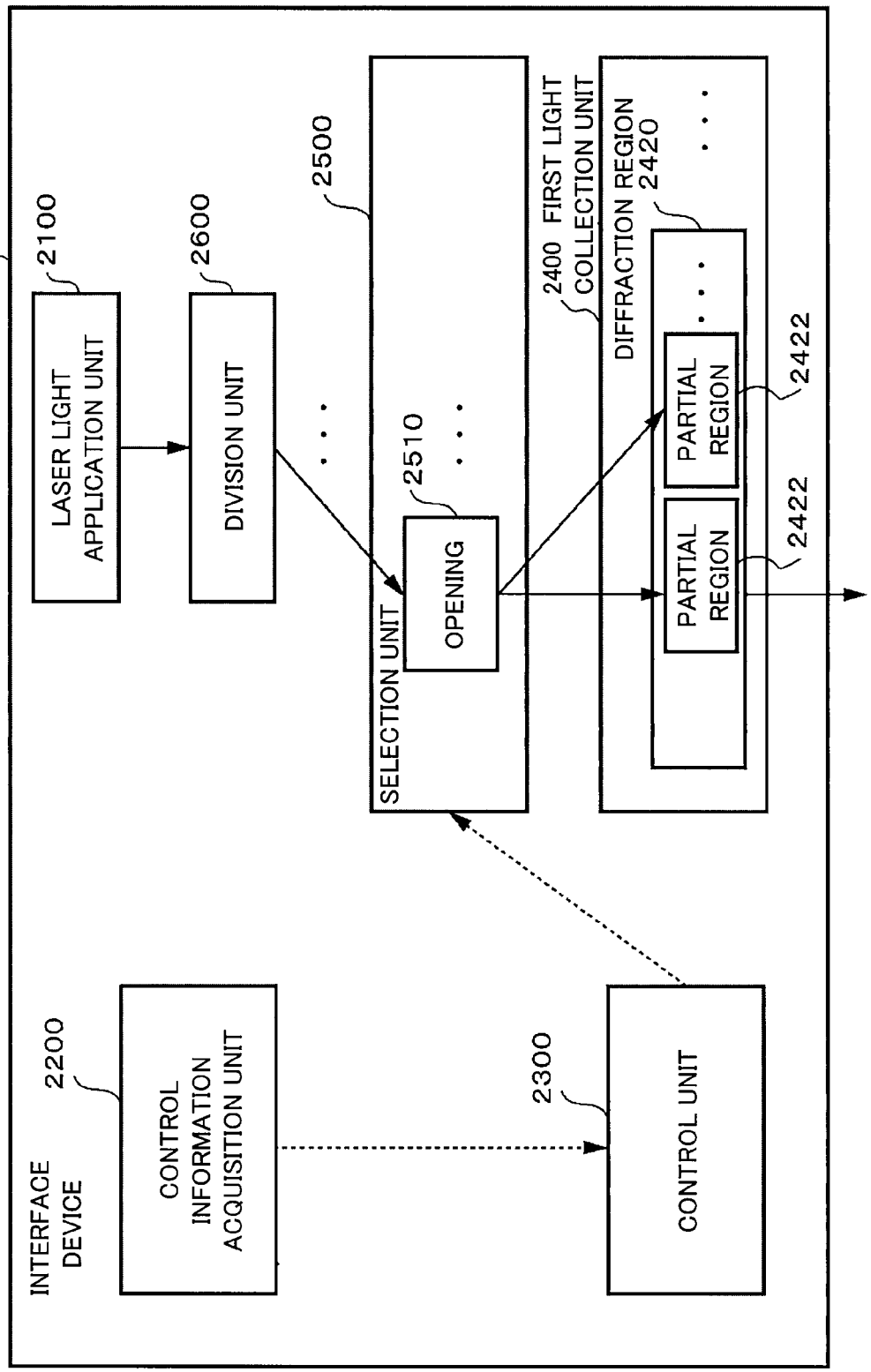
FIG. 12 is a block diagram illustrating an interface device of Exemplary Embodiment 4.

FIG. 12 is a block diagram illustrating the interface device 2000 of Exemplary Embodiment 4. In FIG. 12, each block indicates a configuration of a functional unit rather than a configuration of a hardware unit. In FIG. 12, a solid arrow indicates a flow of laser light, and a dotted arrow indicates a flow of information.

<First Light Collection Unit 2400>

The first light collection unit 2400 of Exemplary Embodiment 4 is position-variable. In addition, the plurality of diffraction regions 2420 that the first light collection unit 2400 has are configured as follows, respectively.

The diffraction region 2420 has a plurality of partial regions 2422 on each of which the laser light is incident. The partial regions 2422 diffract the beams of partial laser light, respectively, such that the incident beams of partial laser light form different images.

Figure 13:
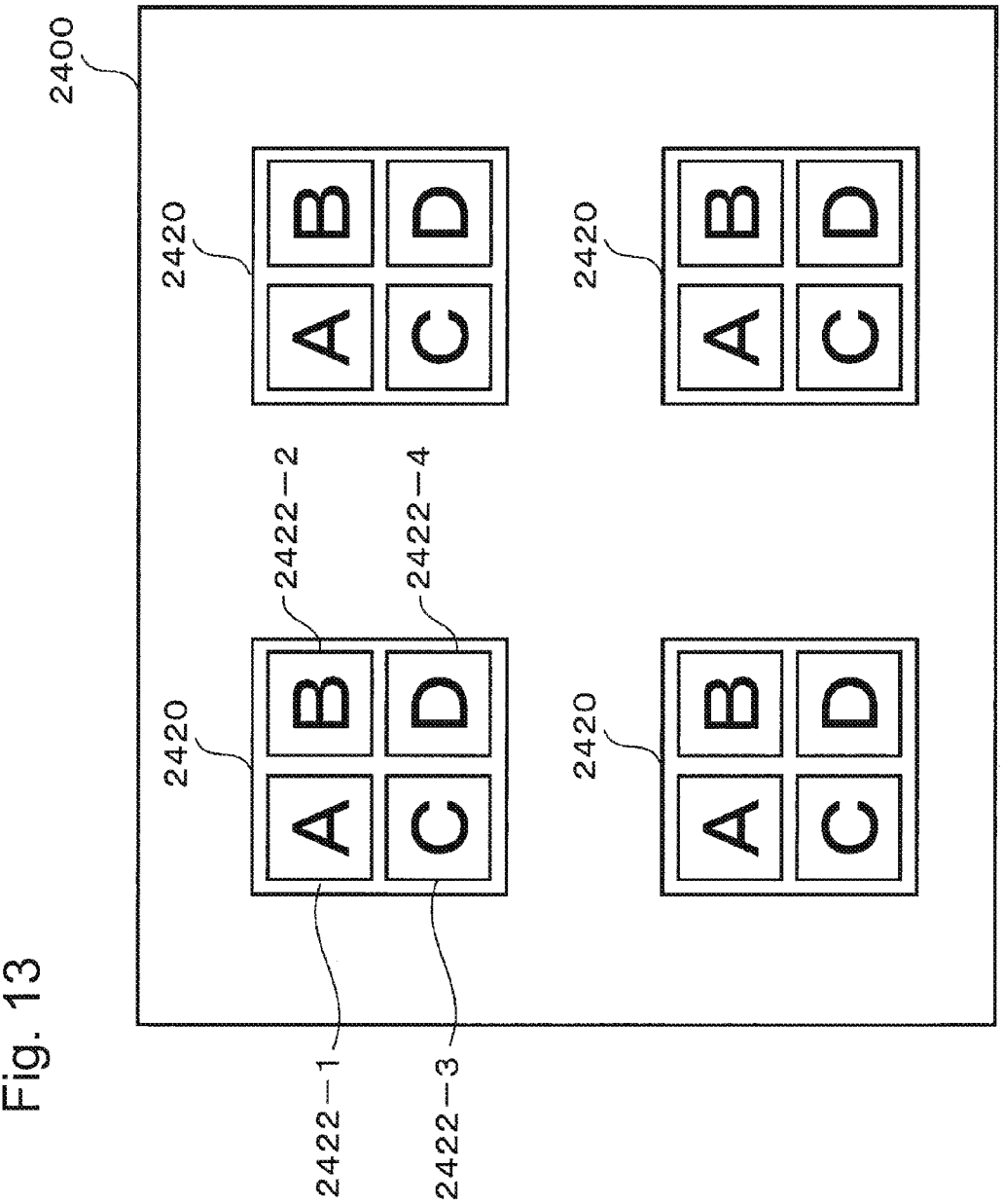
FIG. 13 is a diagram exemplifying the first light collection unit in Exemplary Embodiment 4.

FIG. 13 is a diagram exemplifying the first light collection unit 2400 in Exemplary Embodiment 4. The first light collection unit 2400 has the plurality of diffraction regions 2420. Furthermore, the diffraction region 2420 has four partial regions 2422, a partial region 2422-1 that forms an image of A, a partial region 2422-2 that forms an image of B, a partial region 2422-3 that forms an image of C, and a partial region 2422-4 that forms an image of D. Therefore, the image irradiated by the interface device 2000 changes depending on which partial region 2422 the partial laser light passes through.

It is to be noted that, in FIG. 13, in order to prevent the drawing from being complex, the reference numerals 2422-1 to 4 are denoted only in the partial regions 2422 that the upper-left diffraction region 2420 has. In addition, for the purpose of description, gaps are provided between the partial regions 2422 and between the diffraction regions 2420. However, the gaps are unnecessary when mounting the first light collection unit 2400.

<Control Information Acquisition Unit 2200>

The control information that the control information acquisition unit 2200 acquires further indicates the partial region 2422 on which the partial laser light is to be incident. It is to be noted that the control information may indicate the partial region 2422 on which the partial laser light is to be incident by a shape of the image that the interface device 2000 is to irradiate. In this case, the interface device 2000 further acquires relation information that relates the partial region 2422 to the shape of the image formed by the partial region 2422. It is to be noted that the relation information may be stored inside the interface device 2000, or may be stored outside the interface device 2000.

<Control Unit 2300>

The control unit 2300 controls the selection unit 2500 and the first light collection unit 2400 such that the partial laser light is incident on the diffraction region 2420 and the partial region 2422 indicated by the control information. Specifically, the control unit 2300 selects the aperture 2510 that emits the partial laser light with respect to the diffraction region 2420 indicated by the control information. Then, the control unit 2300 controls the selection unit 2500 such that the selected aperture 2510 emits the laser light. In addition, by controlling a position of the first light collection unit 2400, the control unit 2300 makes the laser light that the selected aperture 2510 has emitted be incident on the partial region 2422 that the control information indicates.

For example, it is assumed that the first light collection unit 2400 is the first light collection unit 2400 illustrated in FIG. 13. It is assumed that, when the position of the first light collection unit 2400 is in an initial state, the partial laser light that is emitted from the aperture 2510 and is incident on the diffraction region 2420 is incident on the partial region 2422-1. When the position of the first light collection unit 2400 is in the initial state, the interface device 2000 irradiates the image of A.

For example, by moving the position of the first light collection unit 2400 to the left, the control unit 2300 makes the partial laser light emitted from the aperture 2510 be incident on the partial region 2422-2. Accordingly, the interface device 2000 irradiates the image of B. In addition, for example, by moving the position of the first light collection unit 2400 downward, the control unit 2300 makes the partial laser light emitted from the aperture 2510 be incident on the partial region 2422-3. Accordingly, the interface device 2000 irradiates the image of C.

Figure 14:
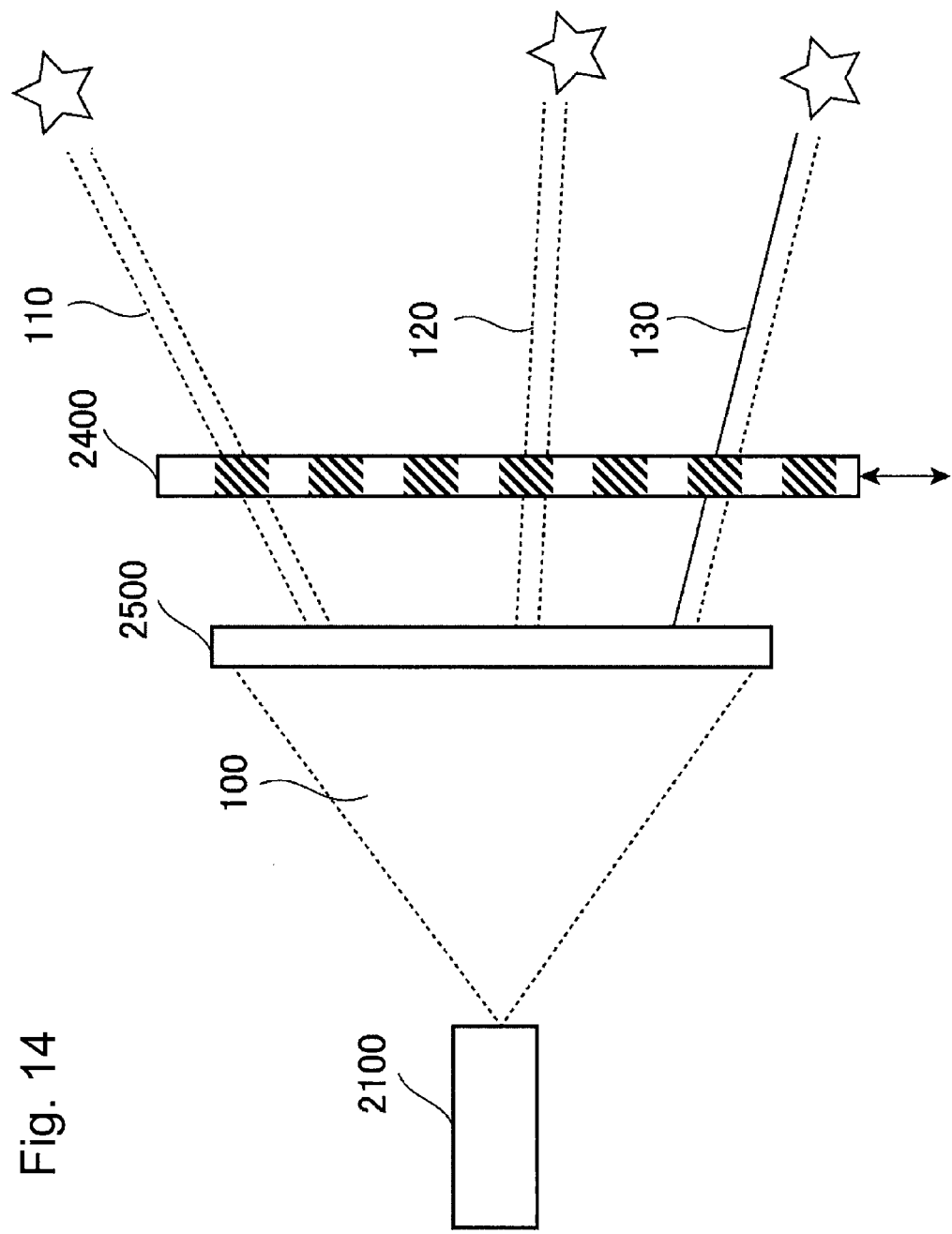
FIG. 14 is a diagram illustrating a state where the interface device of Exemplary Embodiment 4 irradiates an image.

FIG. 14 is a diagram illustrating a state where the interface device 2000 of Exemplary Embodiment 4 irradiates the image. In FIG. 14, a dotted line indicates laser light. In FIG. 14, a shaded part and a solid white part of the first light collection unit 2400 indicate the partial regions 2422 different from each other. The laser light is diffracted by the partial region 2422, and then, is applied from the interface device 2000. By changing the position of the first light collection unit 2400, the control unit 2300 changes the partial region 2422 on which the partial laser light is incident. Accordingly, the image irradiated by the interface device 2000 is changed.

Figure 15:
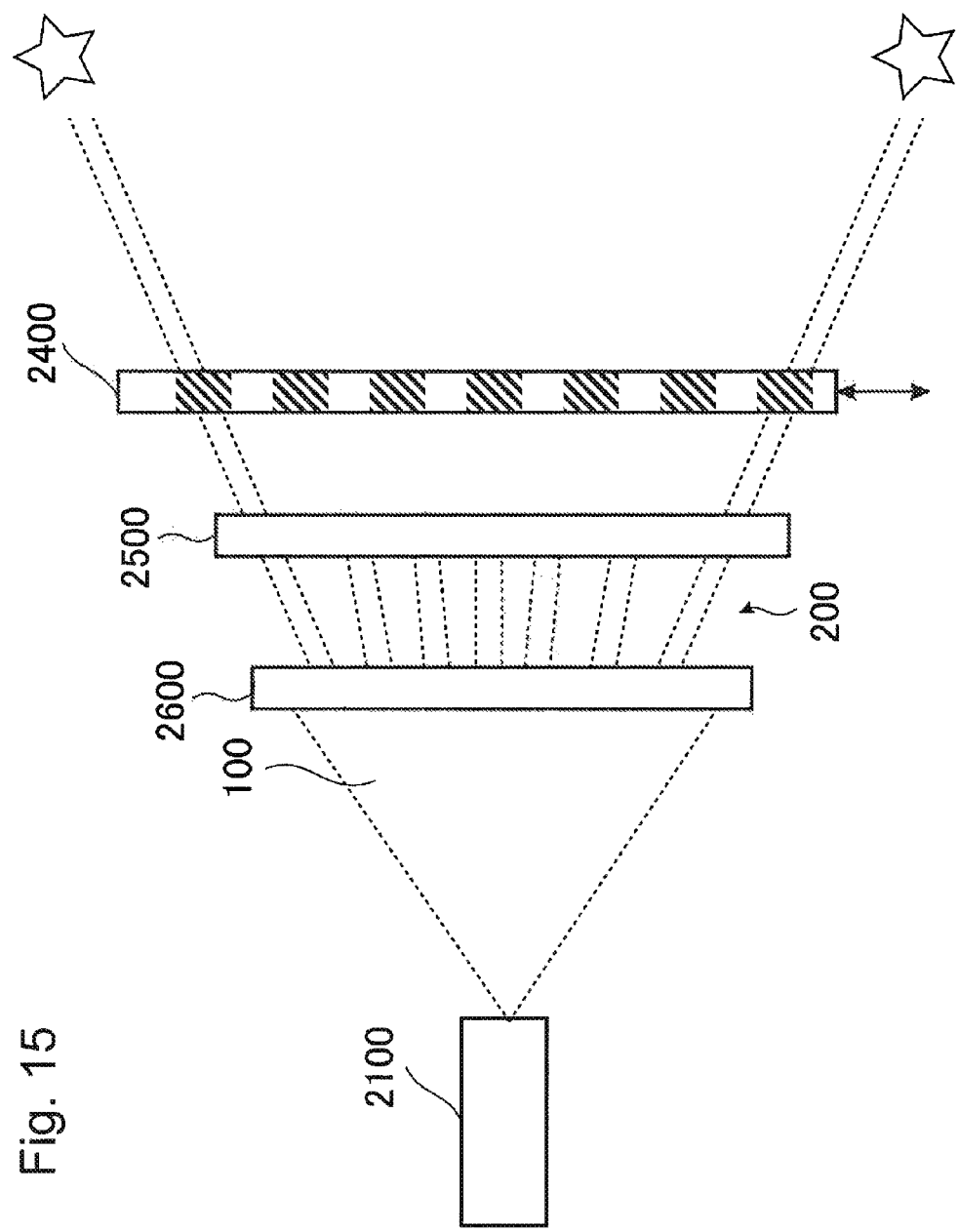
FIG. 15 is a diagram illustrating a state where the interface device of Exemplary Embodiment 4 having the division unit irradiates an image.

The laser light that is incident on the first light collection unit 2400 is, for example, incident on one partial region 2422, with respect to each of the plurality of diffraction regions 2420. In this case, for example, each of the apertures 2510 is designed such that the partial laser light to be emitted passes through one partial region 2422. In addition, for example, the interface device 2000 of Exemplary Embodiment 4 may divide the laser light using the division unit 2600, as illustrated in FIG. 15. The division unit 2600 divides the laser light such that the partial laser light to be formed passes through one partial region 2422, with respect to each of the plurality of diffraction regions 2420.

<Operation and Effect>

According to the interface device 2000 of Exemplary Embodiment 4, by slightly changing the position of the first light collection unit 2400, the image irradiated from the interface device 2000 can be changed. Thus, a complex mechanism for switching the image to be irradiated needs not to be introduced. Thus, a mechanism for switching the image to be irradiated can be introduced into the interface device 2000 without increasing the size of the interface device 2000.

For example, the case where the interface device 2000 is used in a retail store is assumed. In the retail store, various products such as magazines, beverages, breads, and sundries are sold, and it is thought that images different from each other are irradiated with respect to these products. By slightly moving the position of the first light collection unit 2400 to change the partial region 2422 through which the laser light passes, the interface device 2000 of Exemplary Embodiment 4 can deal with such a case.

[Exemplary Embodiment 5]

Figure 16:
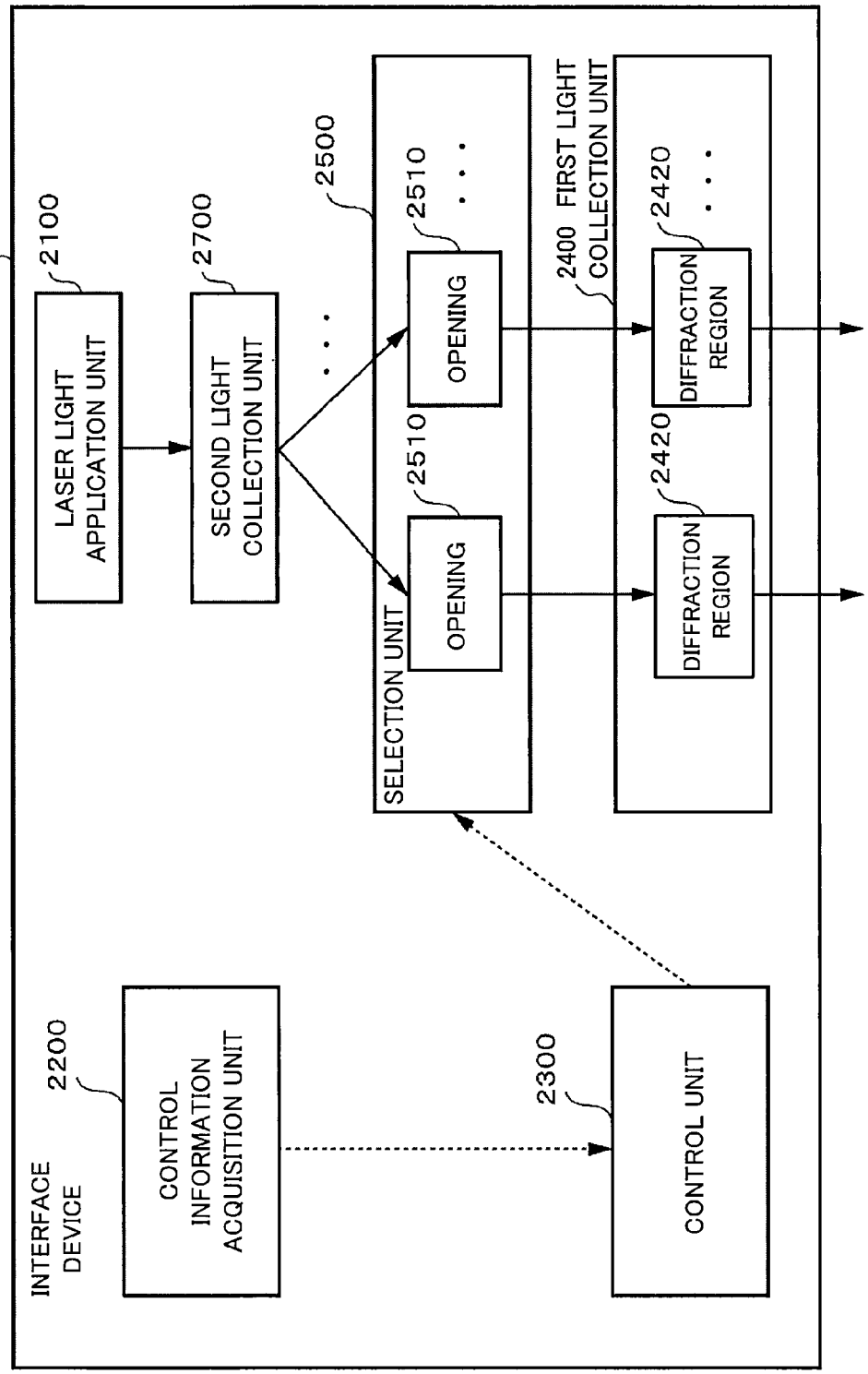
FIG. 16 is a block diagram illustrating an interface device of Exemplary Embodiment 5.

FIG. 16 is a block diagram illustrating the interface device 2000 of Exemplary Embodiment 5. In FIG. 16, each block indicates a configuration of a functional unit rather than a configuration of a hardware unit. In FIG. 16, a solid arrow indicates a flow of laser light, and a dotted arrow indicates a flow of information.

<Second Light Collection Unit 2700>

The interface device 2000 of Exemplary Embodiment 5 has a second light collection unit 2700. Before the laser light applied from the laser light application unit 2100 is incident on the selection unit 2500, the second light collection unit 2700 reduces a diffusion angle of the laser light. For example, the second light collection unit 2700 reduces the diffusion angle of the laser light applied from the laser light application unit 2100 such that the laser light is substantially vertically incident on the selection unit 2500.

<First Light Collection Unit 2400>

The first light collection unit 2400 applies the laser light in a direction different from an incident direction. Thus, the respective diffraction regions 2420 apply the laser light in directions different from each other.

Figure 17:
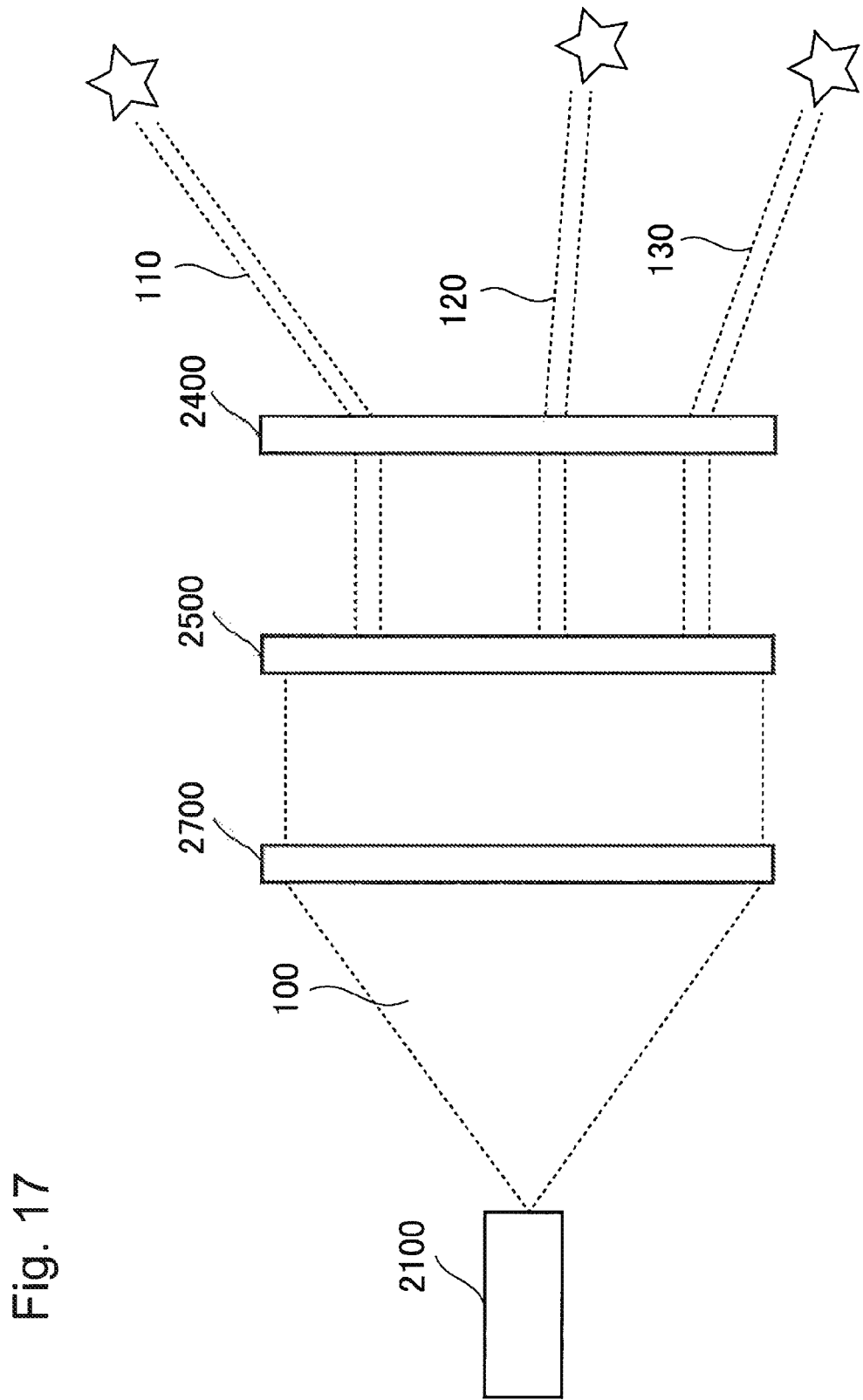
FIG. 17 is a diagram illustrating a state where the interface device of Exemplary Embodiment 5 irradiates an image.

FIG. 17 is a diagram illustrating a state where the interface device 2000 of Exemplary Embodiment 5 irradiates the image. The diffusion angle of the laser light applied from the laser light application unit 2100 is reduced by the second light collection unit 2700. In FIG. 17, the diffusion angle of the laser light becomes almost zero by the second light collection unit 2700. Then, filtering of the laser light is performed by the selection unit 2500. Furthermore, the partial laser light emitted from the selection unit 2500 is diffracted by the first light collection unit 2400, and is applied from the interface device 2000. Here, each of the diffraction regions 2420 changes the traveling direction of the laser light. Accordingly, the beams of laser light 110 to 130 travel in the respective directions indicated by the control information, respectively.

Figure 18:
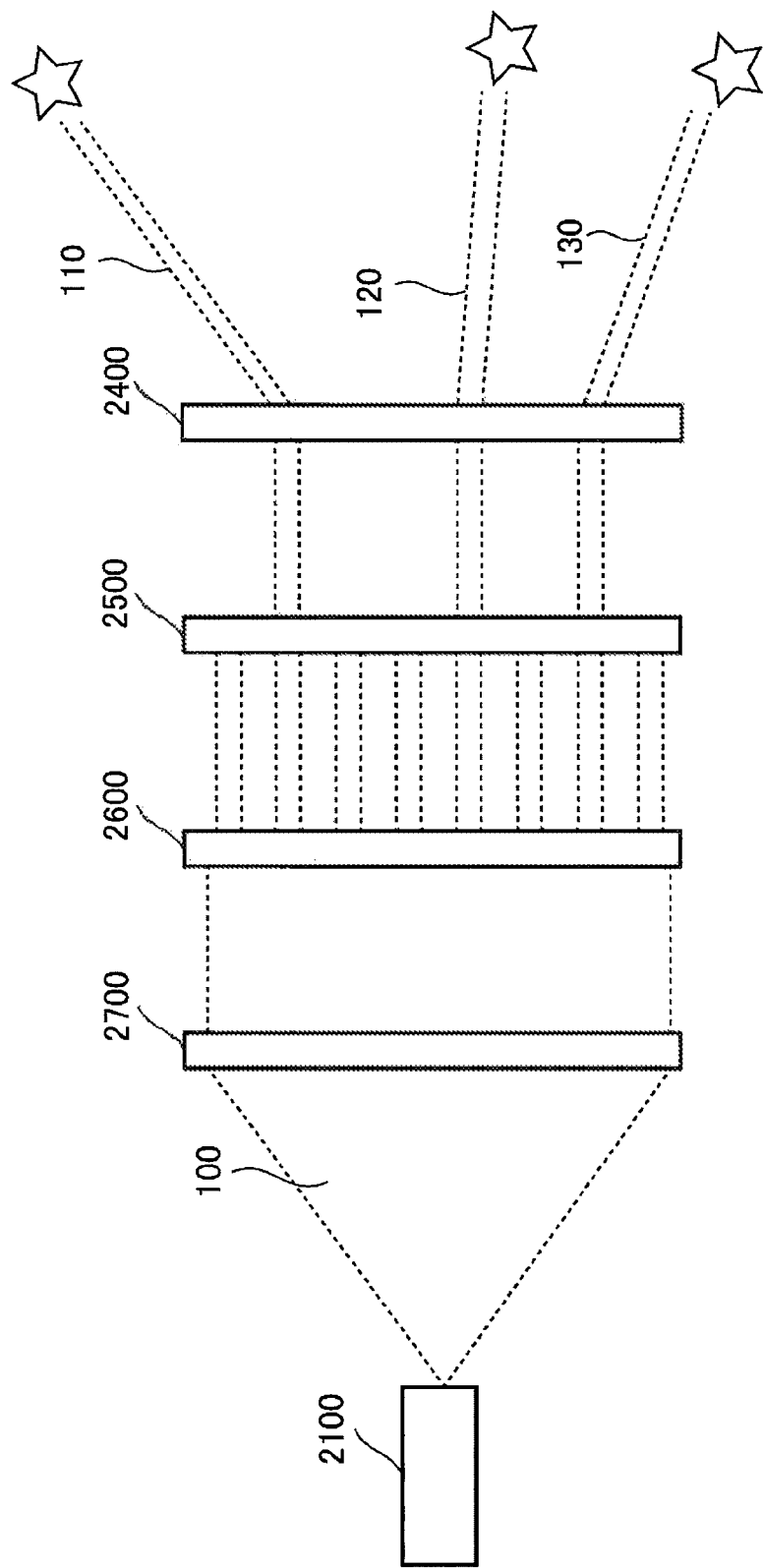
FIG. 18 is a diagram illustrating a state where the interface device of Exemplary Embodiment 5 having the division unit irradiates an image.

It is to be noted that the interface device 2000 of Exemplary Embodiment 5 may have the division unit 2600, as illustrated in FIG. 18. The division unit 2600 divides the laser light whose diffusion angle is reduced by the second light collection unit 2700.

<Operation and Effect>

According to the interface device 2000 of Exemplary Embodiment 5, the diffusion angle of the laser light is reduced by the second light collection unit 2700, and thus, the sizes of the selection unit 2500 and the first light collection unit 2400 can be reduced. Thus, the size of the interface device 2000 can be reduced.

In addition, as illustrated in FIG. 18, when the interface device 2000 of Exemplary Embodiment 5 has the division unit 2600, the decrease in the strength of the laser light when the laser light passes through the selection unit 2500 can be prevented, and thus, the image irradiated by the interface device 2000 becomes brighter.

[Exemplary Embodiment 6]

Figure 19:
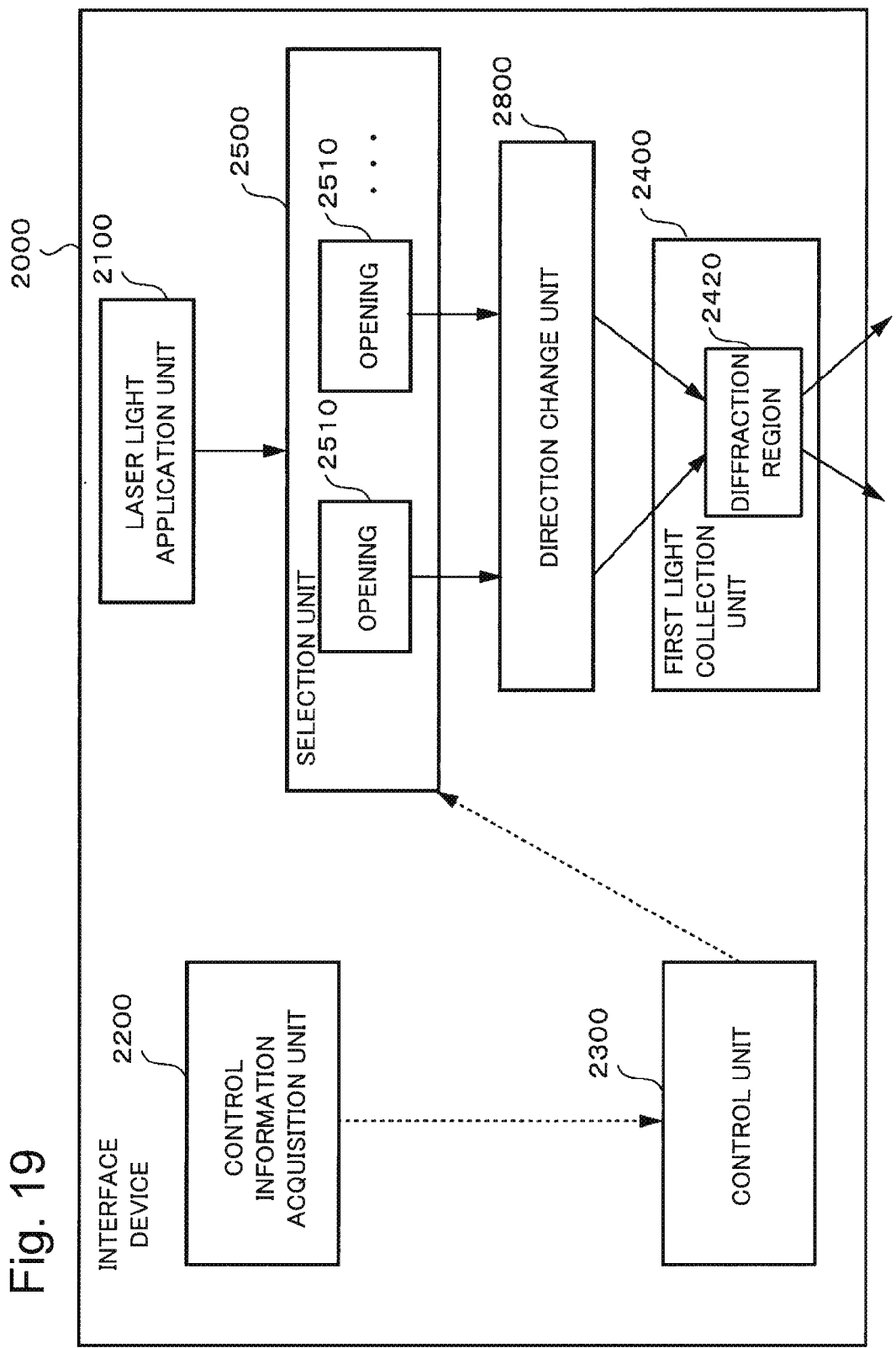
FIG. 19 is a block diagram illustrating an interface device of Exemplary Embodiment 6.

FIG. 19 is a block diagram illustrating the interface device 2000 of Exemplary Embodiment 6. In FIG. 19, each block indicates a configuration of a functional unit rather than a configuration of a hardware unit. In FIG. 19, a solid arrow indicates a flow of laser light, and a dotted arrow indicates a flow of information.

<First Light Collection Unit 2400>

In Exemplary Embodiment 6, the first light collection unit 2400 has at least one diffraction region 2420.

<Selection Unit 2500>

The selection unit 2500 of Exemplary Embodiment 6 has the plurality of apertures 2510 in the same manner as the interface device 2000 of Exemplary Embodiment 2. Accordingly, the plurality of beams of partial laser light are emitted from the selection unit 2500. However, the traveling directions of the beams of partial laser light which have passed through the respective apertures 2510 are changed by a direction change unit 2800 described below so that the beams of partial laser light are incident on the same diffraction region 2420 from the different directions.

<Direction Change Unit 2800>

The interface device 2000 of Exemplary Embodiment 6 has the direction change unit 2800. By changing the traveling directions of the beams of partial laser light that the selection unit 2500 has emitted, the direction change unit 2800 makes the respective beams of partial laser light be incident on the diffraction region 2420 from the different directions. The direction change unit 2800 is an optical element, for example.

<Control Information Acquisition Unit 2200>

The control information acquisition unit 2200 indicates the apertures 2510 that are to emit the beams of partial laser light.

<Control Unit 2300>

The control unit 2300 controls the selection unit 2500 such that the apertures 2510 indicated by the control information emit the beams of laser light. Here, the respective beams of partial laser light emitted from the apertures 2510 are incident on the diffraction region 2420 from the directions different from each other by the direction change unit 2800. Thus, the images formed by the respective beams of partial laser light are irradiated in directions different from each other.

For this reason, by selecting the aperture 2510 that emits the partial laser light, the control unit 2300 selects an irradiation direction of the image. Specifically, the control unit 2300 controls the selection unit 2500 such that the aperture 2510 that emits the partial laser light that travels in the direction that the control information indicates emits the partial laser light.

Figure 20:
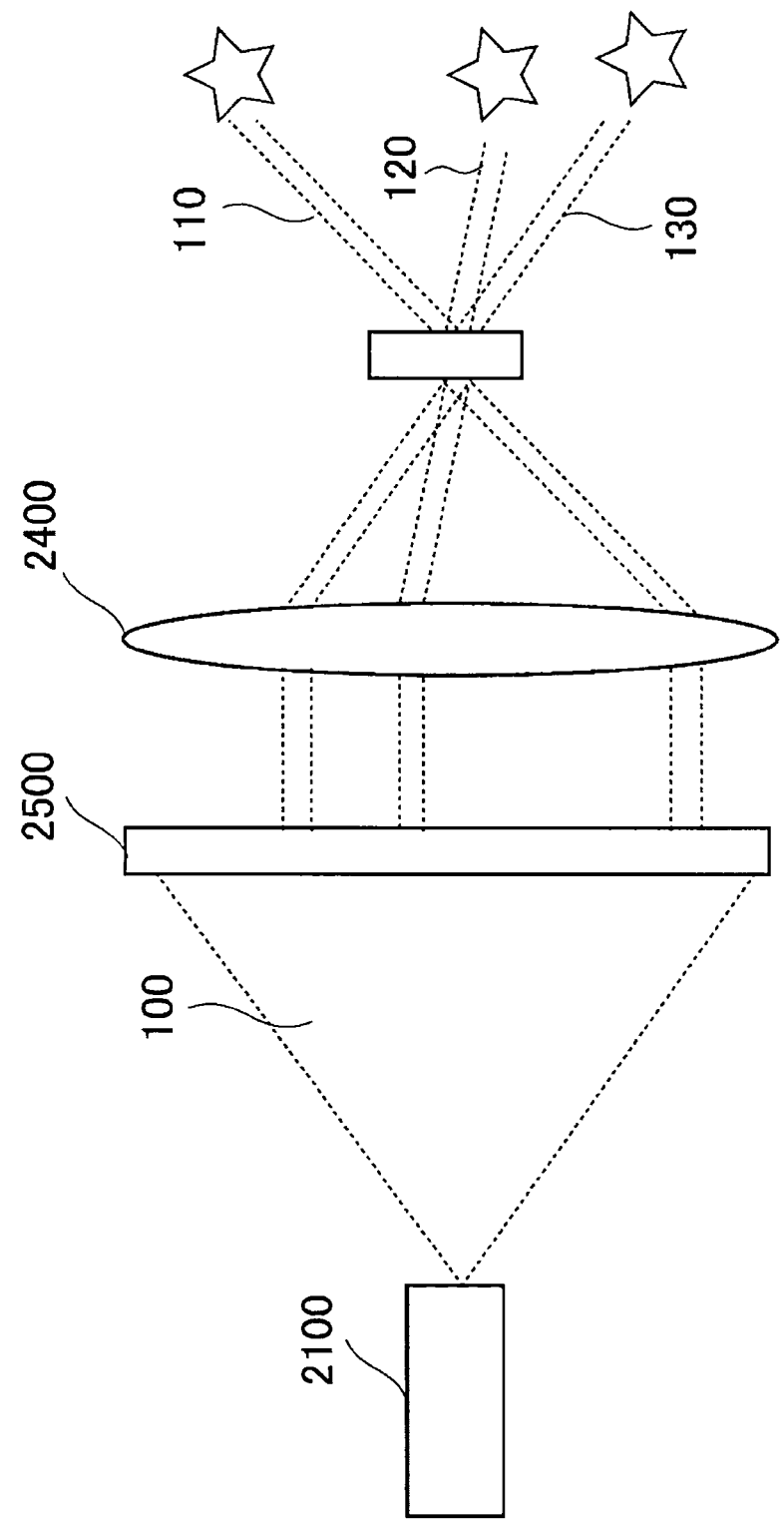
FIG. 20 is a diagram illustrating a state where the interface device of Exemplary Embodiment 6 irradiates an image.

FIG. 20 is a diagram illustrating a state where the interface device 2000 of Exemplary Embodiment 6 irradiates the image. Filtering of the laser light applied from the laser light application unit 2100 is performed by the selection unit 2500. Furthermore, the traveling direction of the laser light which has passed through the selection unit 2500 is changed by the direction change unit 2800, and the laser light is incident on the first light collection unit 2400. Here, the plurality of beams of laser light 110 to 130 that have passed through the selection unit 2500 are incident on the same diffraction region 2420. Then, each of the beams of laser light is applied from the diffraction region 2420, and travels in each of the directions indicated by the control information.

Figure 21:
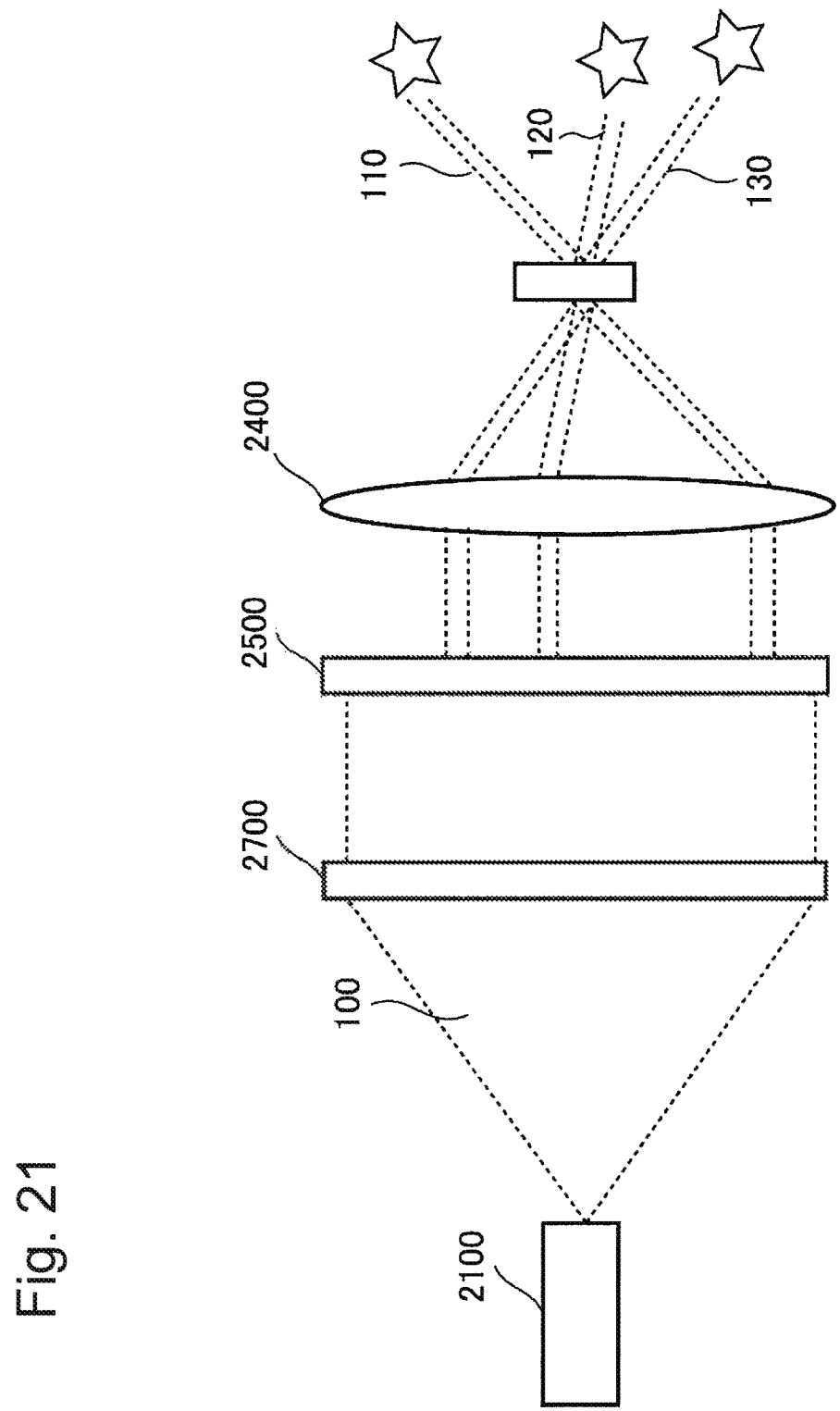
FIG. 21 is a diagram illustrating a state where the interface device of Exemplary Embodiment 6 having a second light collection unit irradiates an image.

It is to be noted that the interface device 2000 of Exemplary Embodiment 6 may have the second light collection unit 2700, as illustrated in FIG. 21. The laser light whose diffusion angle is reduced by the second light collection unit 2700 is incident on the selection unit 2500.

<Operation and Effect>

According to the interface device 2000 of Exemplary Embodiment 6, the respective beams of partial laser light emitted from the selection unit 2500 are incident on one diffraction region 2420 that the first light collection unit 2400 has, from the different directions. Accordingly, the size of the first light collection unit 2400 can be reduced. Accordingly, the size and the cost of the interface device 2000 can be reduced.

In addition, as illustrated in FIG. 21, when the interface device 2000 of Exemplary Embodiment 6 has the second light collection unit 2700, the size of the interface device 2000 can be further reduced.

[Exemplary Embodiment 7]

Figure 22:
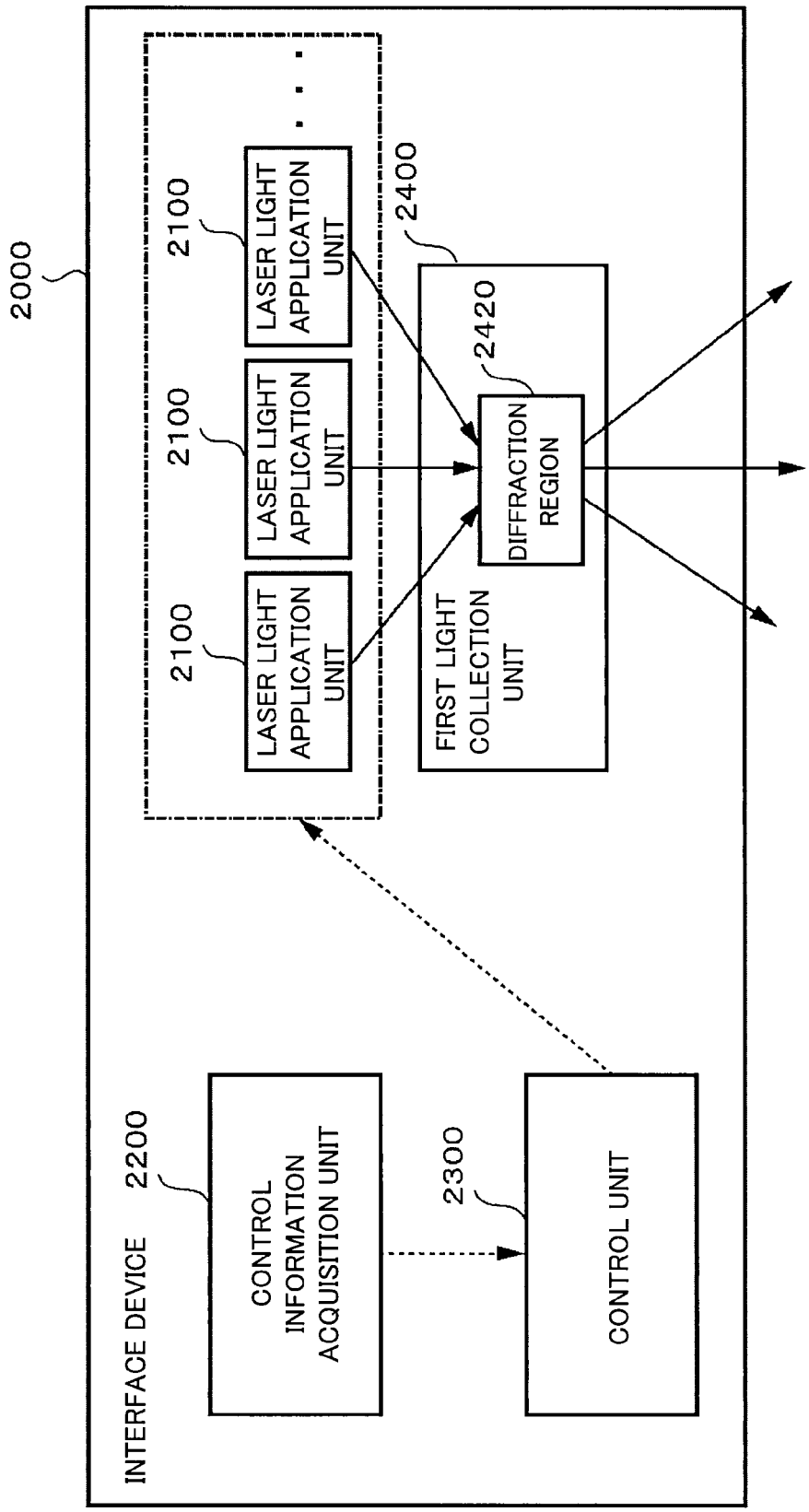
FIG. 22 is a block diagram illustrating an interface device of Exemplary Embodiment 7.

FIG. 22 is a block diagram illustrating the interface device 2000 of Exemplary Embodiment 7. In FIG. 22, each block indicates a configuration of a functional unit rather than a configuration of a hardware unit. In FIG. 22, a solid arrow indicates a flow of laser light, and a dotted arrow indicates a flow of information.

<First Light Collection Unit 2400>

In Exemplary Embodiment 7, the first light collection unit 2400 has at least one diffraction region 2420.

<Laser Light Application Unit 2100>

The interface device 2000 of Exemplary Embodiment 7 has a plurality of laser light application units 2100. The respective laser light application units 2100 apply beams of laser light in directions different from each other and directions that pass through the same diffraction region 2420.

<Control Unit 2300>

The control unit 2300 controls the laser light application units 2100. Specifically, the control unit 2300 makes the laser light application units 2100 that apply the beams of laser light in the directions indicated by the control information apply beams of laser light.

Figure 23:
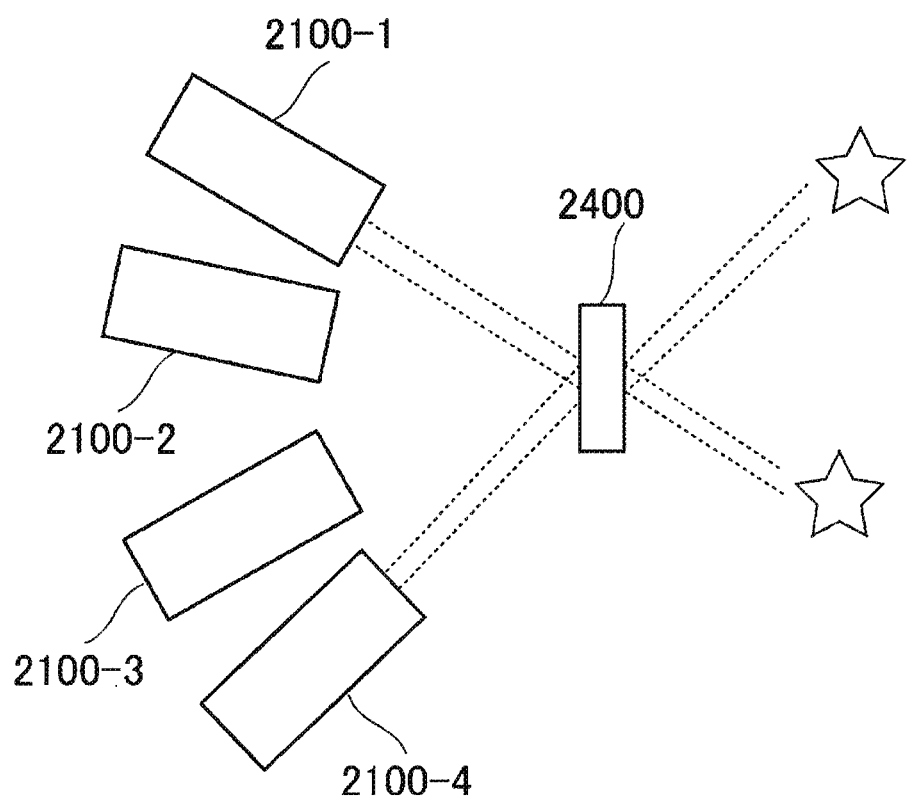
FIG. 23 is a diagram illustrating a state where the interface device of Exemplary Embodiment 7 irradiates an image.

FIG. 23 is a diagram illustrating a state where the interface device 2000 of Exemplary Embodiment 7 irradiates the image. In FIG. 23, a dotted line indicates laser light. The interface device 2000 has four laser light application units 2100, laser light application units 2100-1 to 4. For example, the control unit 2300 makes the laser light application unit 2100-1 and the laser light application unit 2100-4 among the four laser light application units 2100 apply beams of laser light, in accordance with the control information. The beams of laser light applied from the laser light application unit 2100-1 and the laser light application unit 2100-4 pass through the diffraction region 2420 that the first light collection unit 2400 has, respectively. Then, each of the beams of laser light is applied from the diffraction region 2420, and travels in each of the directions indicated by the control information.

<Operation and Effect>

According to the interface device 2000 of Exemplary Embodiment 7, the interface device 2000 can be mounted by a simpler configuration.

[Exemplary Embodiment 8]

The interface device 2000 according to Exemplary Embodiment 8 has the same configuration as any of the interface devices 2000 of Exemplary Embodiments 1 to 7, except for the following points.

<Laser Light Application Unit 2100>

The laser light application unit 2100 of Exemplary Embodiment 8 has a plurality of laser light sources 2120 for applying beams of laser light having different colors. Then, the laser light application unit 2100 applies laser light obtained by synthesizing the beams of laser light applied from the plurality of laser light sources 2120.

Figure 24:
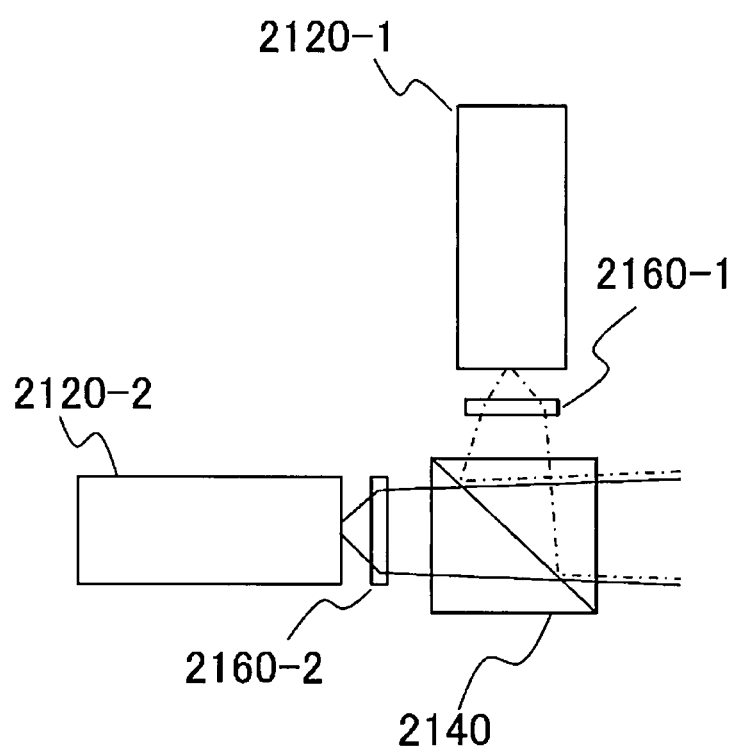
FIG. 24 is a diagram illustrating a configuration example of a laser light application unit.

FIG. 24 is a diagram illustrating a configuration example of the laser light application unit 2100. In FIG. 24, the laser light application unit 2100 has laser light sources 2120-1 and 2120-2 for applying beams of laser light having different colors. In addition, the laser light application unit 2100 has optical elements 2160-1 and 2160-2, and a dichroic mirror 2140. The laser light applied from the laser light source 2120-1 is incident on the dichroic mirror 2140 through the optical element 2160-1. In addition, the laser light applied from the laser light source 2120-2 is incident on the dichroic mirror 2140 through the optical element 2160-2. Then, the dichroic mirror 2140 synthesizes the two beams of laser light to apply the synthesized laser light to the outside of the laser light application unit 2100.

It is to be noted that the number of the laser light sources that the laser light application unit 2100 has is not limited to two. For example, the laser light application unit 2100 may has a laser light source for applying red laser light, a laser light source for applying blue laser light, and a laser light source for applying green laser light.

<Control Information Acquisition Unit 2200>

The control information that the control information acquisition unit 2200 acquires indicates a color of laser light that the interface device 2000 is to apply.

<Control Unit 2300>

The control unit 2300 makes one or more laser light sources 2120 among the plurality of laser light sources 2120 apply beams of laser light such that the color of the laser light applied from the laser light application unit 2100 becomes the laser light having the color indicated by the control information.

It is to be noted that, in order to make a plurality of images having different colors seem to be irradiated at the same time, irradiation of the respective images by the interface device 2000 may be performed in a field sequential manner.

<Operation and Effect>

According to Exemplary Embodiment 8, the laser light having the color indicated by the control information is applied. Accordingly, multicolor display of the image can be achieved. Thus, for a user of the interface device 2000, information can be outputted while being more easily viewable.

EXAMPLES

Hereinafter, Examples of the interface device 2000 will be described. Here, when the interface device 2000 is actually used, the interface device 2000 may further have a function for generating control information in accordance with inputted information, for example. However, the function for generating control information in accordance with inputted information may be provided outside the interface device 2000. The interface device 2000 irradiates a desired image on the basis of the control information generated in accordance with the inputted information.

It is assumed that the interface device 2000 in each of Examples below has the function for generating control information in accordance with inputted information. For example, information of an object, a movement thereof, and the like is inputted into the interface device 2000 by imaging with an imaging element such as a camera, imaging of a three-dimensional object with a three-dimensional depth detecting element, or the like. The term object here is a product such as a book, a food product, or a pharmaceutical product, or is a human body, a hand, or a finger. In addition, information of a movement of a person or an object and the like is inputted into the interface device 2000 by an optical sensor, an infrared sensor, or the like. In addition, for example, information indicating a state of the interface device 2000 itself is inputted into the interface device 2000 by an electronic compass, a GPS (Global Positioning System), a vibration sensor, an orientation sensor, or the like. In addition, information regarding environment is inputted into the interface device 2000 by a wireless receiver. Examples of the information regarding environment include weather information, traffic information, and location information and product information in a store. Here, there is a case where irradiation of an image by the interface device 2000 is performed first, and then, input based on the irradiated image is performed.

It is to be noted that, when there are regulations regarding output power of laser light in a country or a region using the interface device 2000, the interface device 2000 preferably has a function for adjusting the strength of the outputted laser light. For example, when being used in Japan, the strength of each beam of laser light outputted from the interface device 2000 is preferably limited to strength of Class 2 or less.

Hereinafter, examples of the interface device 2000 will be specifically described.

Example 1

Figure 25:
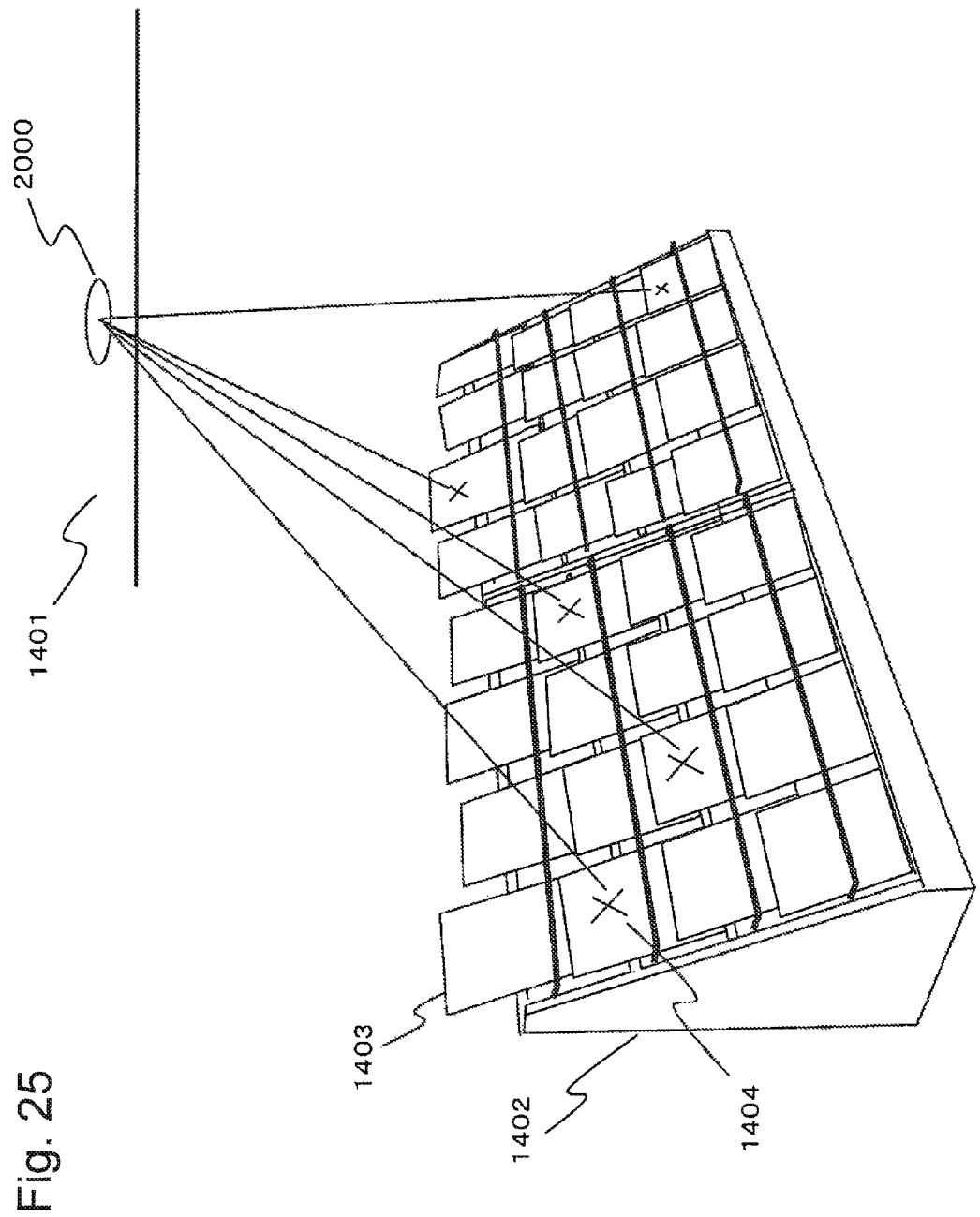
FIG. 25 is a diagram illustrating Example 1.

FIG. 25 is a diagram illustrating an example in which the interface device 2000 is used for supporting product replacement work in a book store, a convenience store, or the like. A product in FIG. 25 is a magazine 1403. The interface device 2000 is provided on a ceiling 1401, and the magazine 1403 is put on a magazine shelf 1402. There are magazines put on a shelf only during a fixed time period, such as weekly, monthly, or quarterly magazines. Thus, the replacement work of these magazines is frequently performed in a store. The work is usually performed by a person in charge of the work, such as a store clerk. For example, the person in charge of the work selects magazines to be replaced while holding a returned books list in which magazines to be returned are listed and comparing a cover of each magazine put on a magazine shelf with the returned books list. The work is laborious work even for a store clerk who is used to the work.

According to the interface device 2000, labor required for the product replacement work like this is significantly reduced. The interface device 2000 in Example 1 has a camera that images a cover of the magazine 1403. The interface device 2000 analyzes each cover imaged by the camera to select the magazine 1403 whose return date is approaching or the magazine 1403 whose return date is overdue. The interface device 2000 of the present example generates control information indicating a direction of the selected magazine 1403. Then, the interface device 2000 irradiates an image that calls attention to the person in charge of the work in the direction of the magazine 1403 indicated by the control information. In FIG. 25, a returned book display mark 1404 is irradiated on the cover of the target magazine 1403.

By display of a bright image that is a feature of the interface device 2000, even in a place whose environmental light is extremely bright, such as a book store or a convenience store, the returned book display mark 1404 is displayed with sufficient visibility. Here, the interface device 2000 can irradiate marks different from each other on a cover of a magazine whose return date is approaching or a cover of a magazine whose return date is overdue.

By using the interface device 2000 in this manner, the person in charge of the work can perform product replacement by simple work in which books are collected with the help of the returned book display mark 1404. Since a document such as the returned books list needs not to be held, both hands can be used, and working efficiency is significantly increased.

It is to be noted that a method for inputting information into the interface device 2000 may be a method other than imaging with a camera. For example, an IC tag is embedded in each magazine 1403, and an IC tag reader and a device for transmitting information that the IC tag reader has read are provided in the magazine shelf 1402. A function for acquiring the information transmitted from the device is provided in the interface device 2000. Accordingly, the interface device 2000 receives the information acquired from the IC tag embedded in each magazine 1403 as input and can generate control information on the basis of the information.

Example 2

Figure 26:
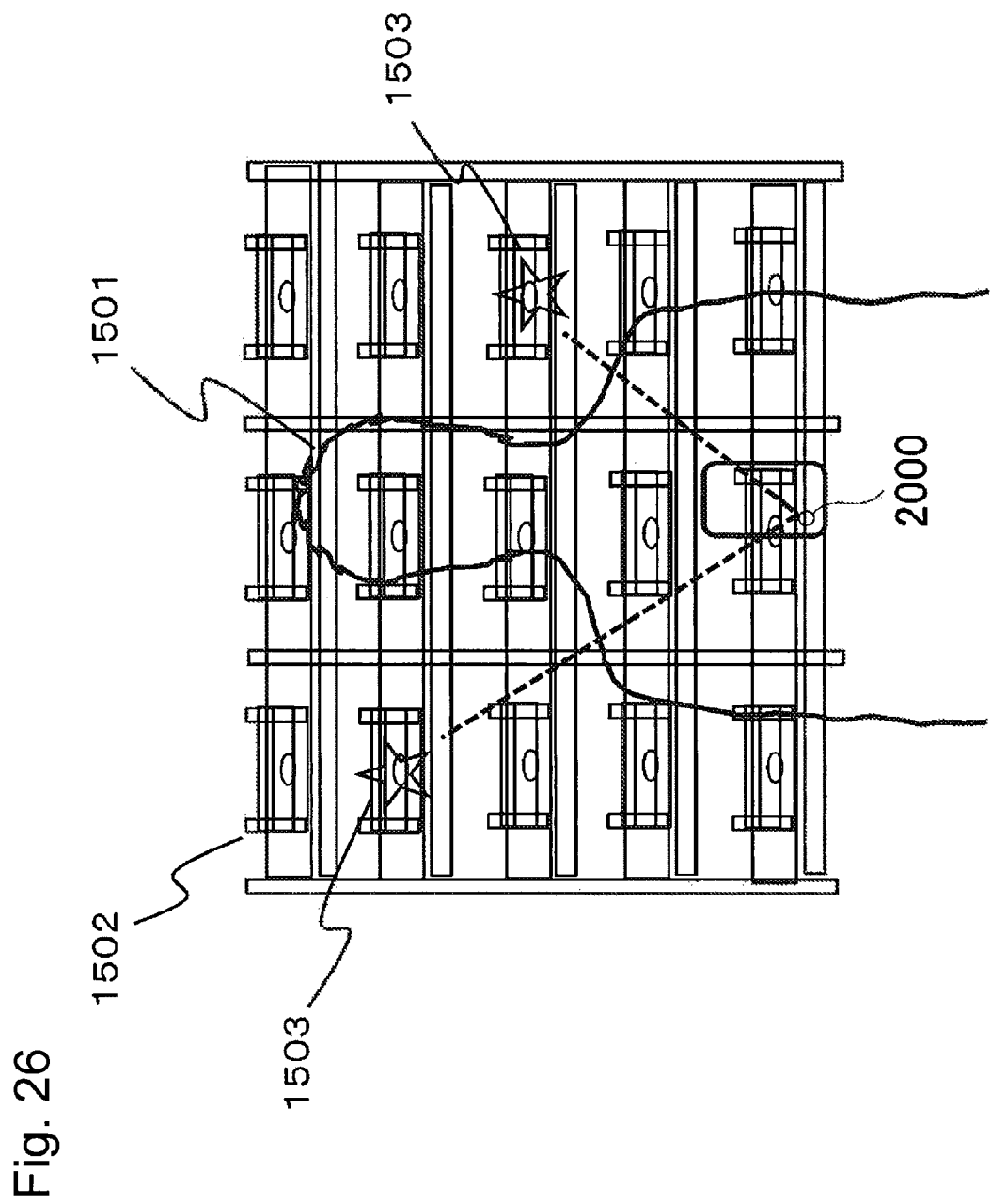
FIG. 26 is a diagram illustrating Example 2.

FIG. 26 is a diagram illustrating an example in which the interface device 2000 is used for the purpose of supporting work to select a target article from a plurality of articles put on a shelf. For example, in a pharmacy, a store clerk sees a prescription supplied by a customer and selects a target medicine from a plurality of medicines put on a shelf. In addition, in a factory, a worker selects a target component from a plurality of components put on a shelf. In such a shelf, for example, several dozen to several hundred drawers are provided. Thus, the worker must select a drawer containing a target article from a lot of drawers with the help of a label or the like attached to each drawer.

The interface device 2000 of the present example supports the work like this. It is to be noted that, in the present example, the worker is thought to use the interface device 2000 embedded in a mobile device. For example, the worker uses the mobile device with the mobile device dangled around the worker's neck. As described above, the interface device 2000 is compact, and thus, can be embedded in the mobile device.

As is the case in Example 1, a camera is provided in the interface device 2000, and information is inputted from the camera. The description is provided by assuming use in a pharmacy. Firstly, data obtained from a prescription is inputted into the interface device 2000 in advance. Then, when a worker 1501 stands in front of a medicine shelf 1502, the interface device 2000 reads a label attached to each drawer 1502 using the camera. Then, the interface device 2000 compares the data obtained from the prescription and the label read from the camera to generate control information indicating a direction of the drawer 1502 on which an image is to be irradiated. Then, the interface device 2000 irradiates a display mark 1503 toward the drawer 1502 in accordance with the control information.

By using the interface device 2000, the worker can obtain the target article only by opening the drawer on which the display mark 1503 is irradiated. There is no need to search a target drawer from a lot of drawers and to memorize positions of the drawers so as to increase working efficiency. In addition, human error, such as mix-up of articles, is reduced. Furthermore, since a note indicating a target article, such as the prescription in the above-described example, needs not to be held, the worker can use both hands as is the case in Example 1. Thus, working efficiency is increased.

It is to be noted that a method in which the interface device 2000 receives the input of information may be a method using an IC tag or the like, as is the case in Example 1.

Example 3

Figure 27:
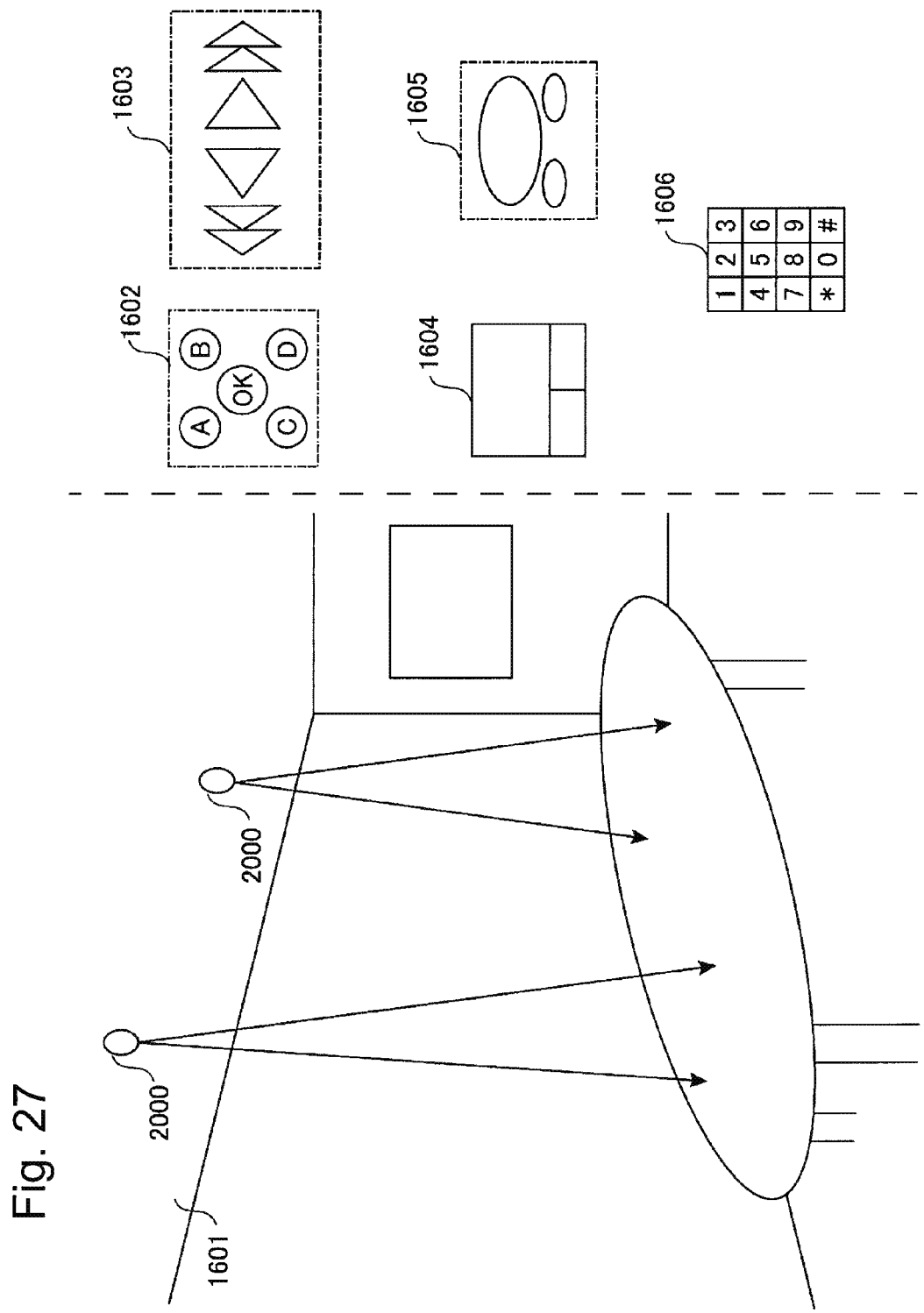
FIG. 27 is a diagram illustrating Example 3.

FIG. 27 is a diagram illustrating an example in which the interface device 2000 is used for supporting a presentation in a meeting room. When a presentation is made in a meeting room, an operation of a projector for irradiating an image on a screen is usually performed with one PC (Personal Computer). A presenter progresses meeting while operating the PC. Switching of picture images is performed by a mouse click. In a large meeting room, the presenter often stands at a position distant from the PC, and needs to move so as to operate the PC. The movement of the presenter at every operation of the PC is bothersome for the presenter, and moreover, is obstructive to the progress of the meeting.

By using the interface device 2000, the inconvenience like this is reduced, and the meeting can be made to be smoothly progressed. A single or a plurality of the interface devices 2000 are provided on a ceiling 1601 depending on the size of the meeting room. The interface device 2000 receives the input of information using a camera. For example, the interface device 2000 monitors a movement of each of participants who participate in the meeting, and irradiates images 1602 to 1606 on a meeting table at the participant's request. The participant presents his/her own request by making a gesture set in advance, for example, raising his/her palm upward. The interface device 2000 detects the movement using the camera. Then, the interface device 2000 generates control information indicating an image to be irradiated and a direction in which the image is to be irradiated on the basis of the detected gesture. Then, an image that meets the participant's request is irradiated in accordance with the control information.

The image 1602 is a menu selection screen. By selecting a desired button therein, picture images of the images 1603 to 1606 can be selected. For example, the image 1603 indicates a button for advancing and returning a page. The image 1604 and the image 1605 indicate mouse pads. In addition, the image 1606 indicates a numeric keypad. For example, the interface device 2000 detects operations with respect to these images by meeting participants using the camera. For example, when a participant performs an operation to push a button for advancing a page, the interface device 2000 transmits indication for advancing a page to the PC. The PC receives the indication to advance a page. It is to be noted that a function for detecting an operation of a participant with respect to an image and a function for transmitting indication to the PC may be provided outside the interface device 2000.

By using the interface device 2000 in this manner, a virtual interface environment can be provided by the input of information by a gesture and the output of information using an image. The meeting participant can perform an operation of a screen whenever he/she chooses without getting up from a chair. Thus, time shortening and efficiency promotion of the meeting are achieved.

Example 4

Figure 28:
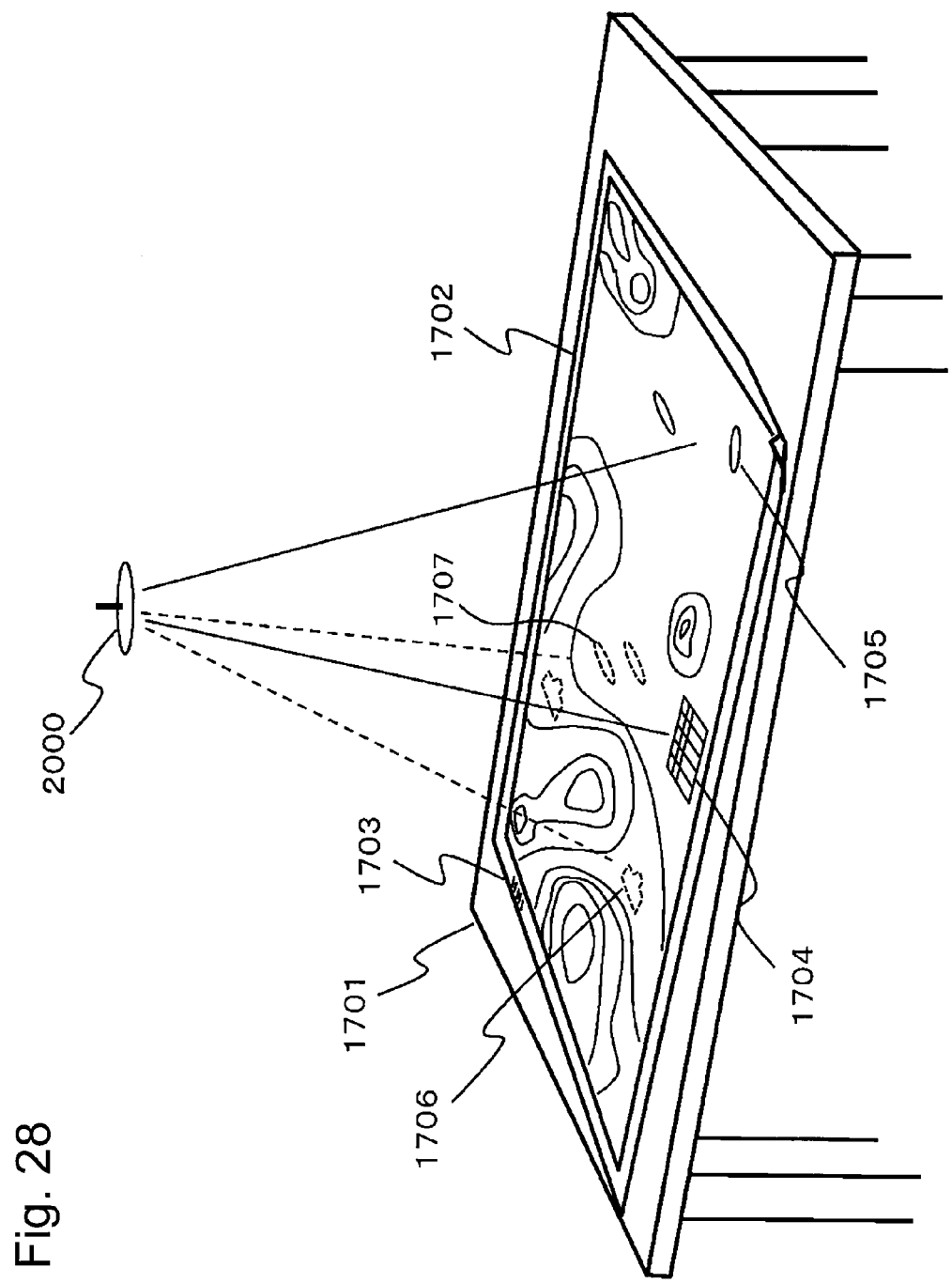
FIG. 28 is a diagram illustrating Example 4.

FIG. 28 is a diagram illustrating an example in which a meeting environment is created at a visiting destination by using the interface device 2000 embedded in a mobile device. It can be thought that a variety of places, such as a room other than a meeting room, in a tent, or beneath a tree is changed to a simple meeting place. In Example 4, in order to share information by spreading a map, a simple meeting environment is created. It is to be noted that the interface device 2000 of Example 4 also receives the input of information using a camera.

The mobile device in which the interface device 2000 is embedded is hung at a somewhat high position. A map 1702 is spread on a table 1701 placed under the interface device 2000. The interface device 2000 recognizes the map 1702 using the camera. For example, the interface device 2000 reads an identifying code 1703 lettered on the map to recognize the map 1702. Then, by irradiating an image on the map 1702, the interface device 2000 makes various information be irradiated and displayed on the map. For example, the interface device 2000 irradiates an operation pad 1704, a friendly ship 1705, an enemy territory 1706, and an enemy ship 1707. The information that the interface device 2000 is to irradiate may be stored inside the interface device 2000 or may be collected through the Internet or by wireless.

As described above, the interface device 2000 has low power consumption and is compact. Thus, the interface device 2000 can be driven by a battery. As a result, a user of the interface device 2000 can carry the interface device 2000 to various places and create the meeting environment as described above at the places. It is to be noted that an image that the interface device 2000 irradiates does not need focusing, and thus, a visible image can be irradiated even on a curved place or a rugged object. In addition, the interface device 2000 enables bright display, and thus, can be used in a bright environment. In other words, a precondition in the use of mobiles, not selecting an environment, is satisfied.

Example 5

Figure 29:
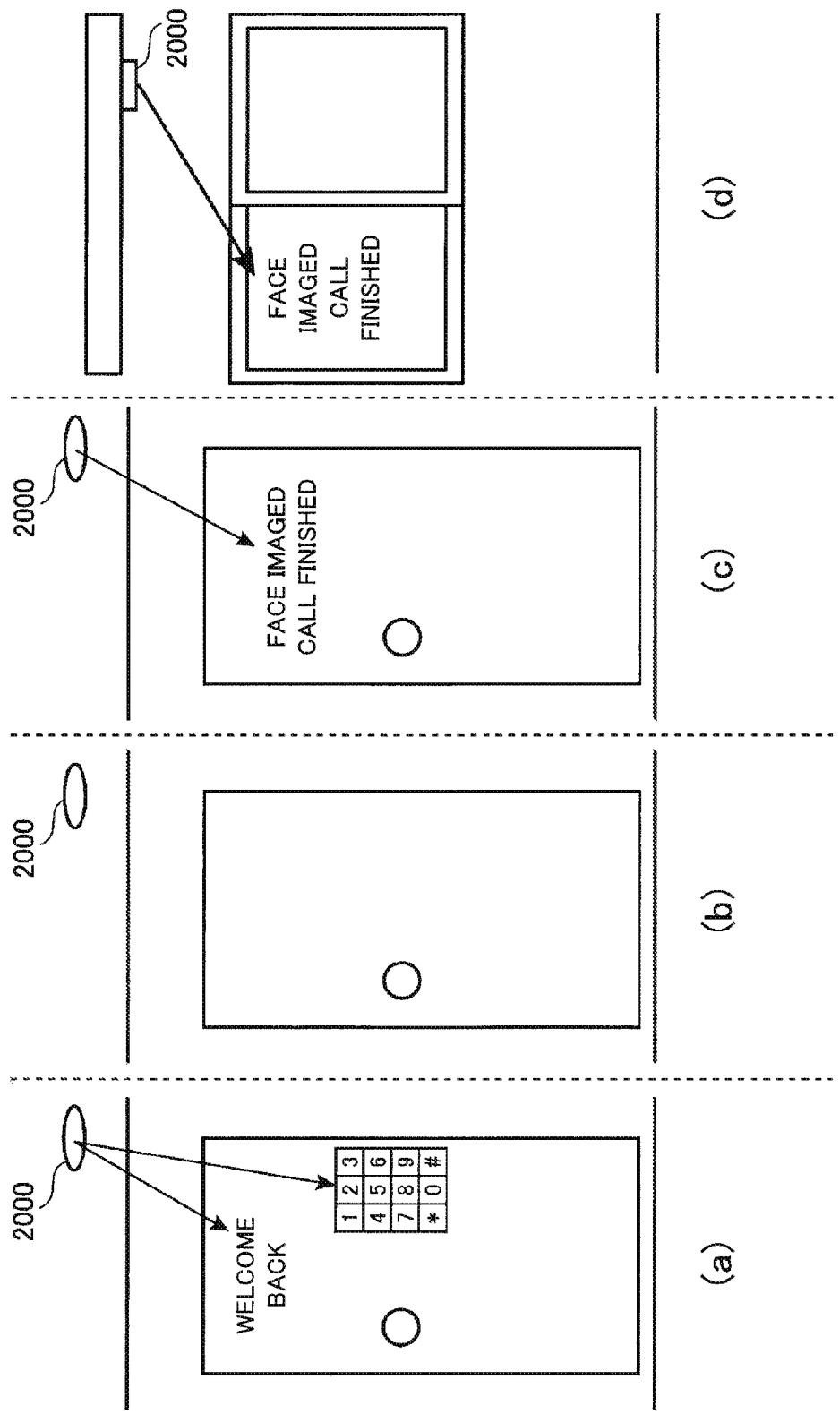
FIG. 29 is a diagram illustrating Example 5.

FIG. 29 is a diagram illustrating an example in which the interface device 2000 is applied to an entering and leaving management system. For example, the interface device 2000 provided on a ceiling of an entrance or eaves in a house monitors and responds to a person and a movement thereof.

Regarding room entering management, with respect to persons having a qualification for room entering, a database is created in advance. When entering a room, personal authentication such as a face authentication, fingerprint authentication, or iris authentication function is performed by the interface device 2000 or another device. The interface device 2000 irradiates images such as FIGS. 29(*a*) to 29(*d*) on the basis of control information generated on the basis of the result of the personal authentication.

FIG. 29(*a*) is a response to a person having a qualification for room entering. Display of a message, display of a password input pad for further confirmation, and the like are performed. FIG. 29(*b*) is a response to a general visitor. In this case, nothing is performed. For example, a usual reception system such as an intercom is used (not illustrated in drawing). FIG. 29(*c*) is a response to a suspicious person. When a movement to forcibly trespass such as picking is recognized, the interface device 2000 irradiates an image indicating a warning to fight off a suspicious person. In addition, a call to a security company may be further performed. FIG. 29(*d*) is a system for fighting off a suspicious person who tries to enter from a window in the same manner. Although there is an existing system for fighting off a suspicious person by detecting vibration caused by breaking a window, by using the interface device 2000, a suspicious person can be fought off before a window is broken.

An irradiated image in the example will be further described. If display illustrated in FIG. 29 is tried to be performed using a general projector, a fairly large device needs to be provided. In the interface device 2000, if display illustrated in FIG. 29 is tried to be performed by only laser light applied from one laser light source, an image may become somewhat dark. For this reason, in the example, laser light is made to be generated from a separate laser light source with respect to one character or one key, for example. In this case, the interface device 2000 has a plurality of laser light sources. Accordingly, a sentence illustrated in FIG. 29 can be displayed more brightly.

By using the interface device 2000 as illustrated in the present example, entering a room is possible without a key, and the effect of fighting off a suspicious person can be expected.

Example 6

Figure 30:
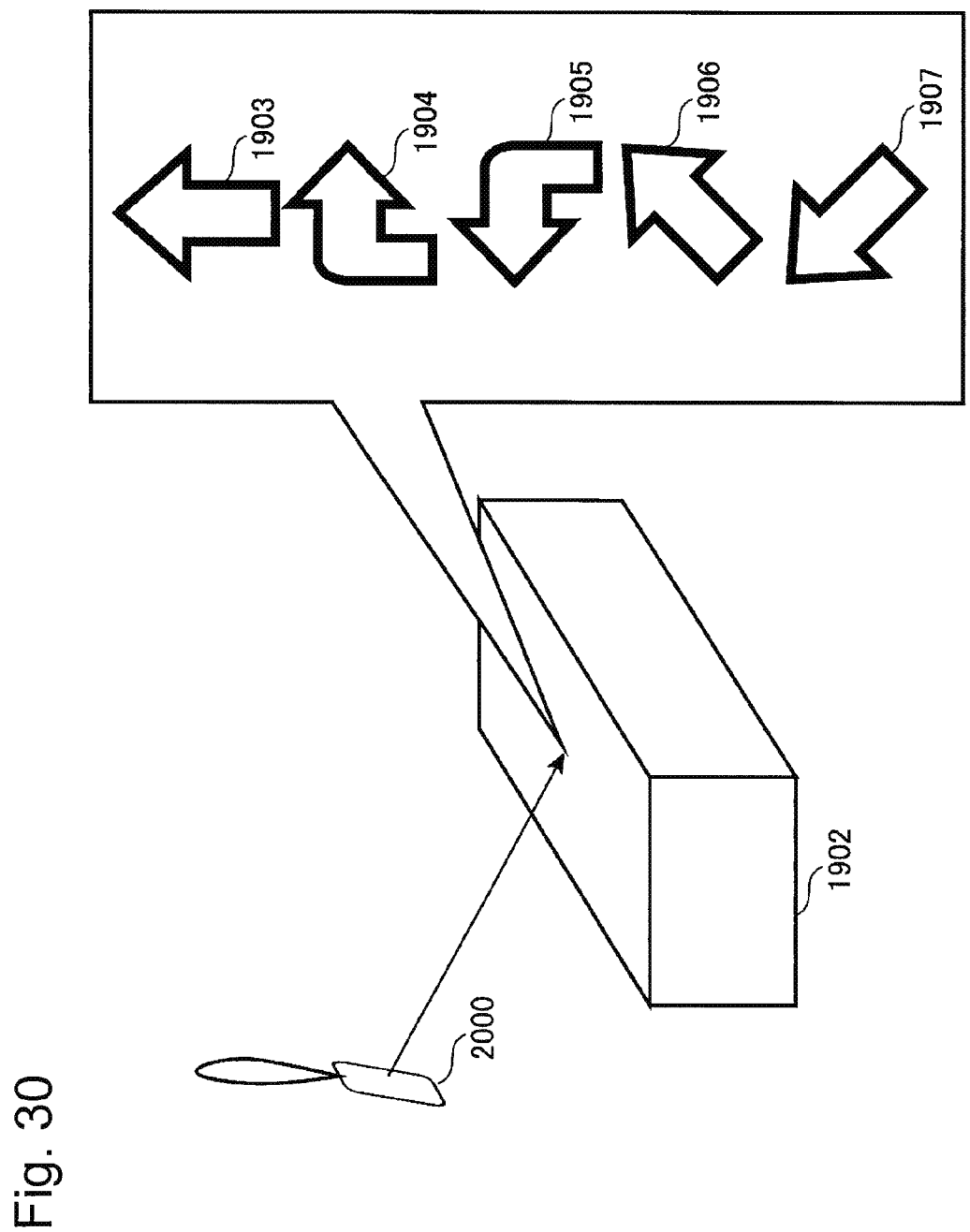
FIG. 30 is a diagram illustrating Example 6.

FIG. 30 is a diagram illustrating an example in which the interface device 2000 is used for supporting a delivery business. When delivering a package to an unfamiliar place, a deliverer needs to move while checking a traveling direction with a map. However, the deliverer usually holds the package with both hands, and thus, both hands are often occupied. In addition, when a delivery destination is an overly complicated place, even if both hands are not occupied, it is sometimes difficult to read the traveling direction from the map.

By displaying a direction in which the deliverer is to travel as an image, the interface device 2000 of the present example supports the delivery business. For example, the deliverer dangles the interface device 2000 from his/her neck. Here, it is assumed that the interface device 2000 includes a GPS. In addition, it is assumed that the interface device 2000 has a function for generating control information by determining the traveling direction using location information and map data acquired from the GPS. It is to be noted that the GPS and the function for generating control information using the GPS may be provided outside the interface device 2000.

The interface device 2000 irradiates the image indicating the traveling direction on the basis of the control information. For example, a direction in which an image is to be irradiated, which the control information indicates, is on a package 1902 that the deliverer holds. For example, the interface device 2000 includes a camera, and detects a direction of the package that the deliverer holds. The interface device 2000 irradiates an arrow indicating the traveling direction, for example, arrows 1903 to 1907, on the package 1902. It is to be noted that the image indicating the traveling direction may be irradiated at deliverer's feet or the like. By seeing the arrow irradiated on the package 1902, the deliverer can know the travel direction without checking the map.

As described above, by using the interface device 2000, the deliverer needs not to deposit the package to see and check the map. Thus, there are effects of time shortening of a delivery operation and reduction in inconvenience due to the delivery operation.

The laser light application unit 2100 that the interface device 2000 used for the purpose of Example 6 has will be further described using FIG. 31. When the interface device 2000 is used for the purpose of Example 6, each image is preferably irradiated at about the same position. For example, in FIG. 31, the arrow 1903 and the arrow 1905 are designed so as to be irradiated in almost all the same direction (example: right opposite). Accordingly, a user can fix a position about line of sight. It is to be noted that FIG. 31 illustrates the interface device 2000 of Exemplary Embodiment 5. However, the interface device 2000 used for the purpose of Example 6 is not limited to the interface device 2000 of Exemplary Embodiment 5.

Heretofore, the exemplary embodiments of the present invention has been described with reference to the drawings, but these are examples of the present invention, and various configurations other than those above can be applied.

Hereinafter, examples of referential modes are supplementarily noted.

1. An interface device including:

a laser light application means having a laser light source for applying laser light;

a control information acquisition means for acquiring control information that is information indicating each of a plurality of directions in which an image is to be irradiated;

a control means for controlling a direction in which the image is irradiated on the basis of the control information; and a first light collection means, on which the laser light is incident, for diffracting the laser light such that the laser light forms the image that is not similar to that at the time of incidence.

2. The interface device according to 1., wherein the first light collection means has a plurality of diffraction regions that diffract the laser light such that the laser light forms the images that are independent on each other, the control information indicates the diffraction region on which the laser light is to be incident to indicate a direction in which the laser light is to be applied, and the control means controls a direction in which the laser light is applied such that the laser light is incident on the diffraction region indicated by the control information.

3. The interface device according to 2., including:

a selection means including a plurality of apertures which perform filtering of a part of the laser light applied by the laser light application means, respectively, to emit beams of partial laser light, and in which the emitted beams of partial laser light are incident on the diffraction regions different from each other, wherein the plurality of diffraction means diffract the incident beams of partial laser light, respectively, and the control means controls the selection means such that the beams of partial laser light are emitted with respect to the diffraction regions that the control information indicates.

4. The interface device according to 3., including:

a division means for dividing the laser light applied by the laser light application means to form the plurality of beams of partial laser light and making the respective beams of partial laser light be incident on only the plurality of apertures.

5. The interface device according to 3. or 4., wherein the first light collection means is position-variable, each of the plurality of diffraction regions has a plurality of partial regions on each of which the laser light is incident, the plurality of partial regions diffract the beams of partial laser light, respectively, such that the incident beams of laser light form different images, the control information further indicates a partial region to which the laser light is to be applied, and the control means controls the selection means and the first light collection means such that the laser light is incident on the partial region indicated by the control information.

6. The interface device according to any one of 3. to 5., wherein the selection means has a second light collection means for, before the laser light applied from the laser light application means is incident on the diffraction means, reducing a diffusion angle of the laser light, and the first light collection means irradiates the image in a direction different from an incident direction.

7. The interface device according to 1., wherein the first light collection means has at least one diffraction region that diffracts the laser light so as to form the image, the interface device includes:

a selection means having a plurality of apertures which perform filtering of a part of the laser light applied by the laser light application means to emit beams of partial laser light, respectively; and a direction change means that makes the beams of partial laser light emitted by the respective apertures be incident on the same diffraction region from directions different from each other, the control information indicates the apertures that are to emit the beams of partial laser light to indicate a direction in which the laser light is to be applied, and the control means controls the selection means such that the apertures indicated by the control information emit the beams of partial laser light.

8. The interface device according to 1., wherein the first light collection means has at least one diffraction region that diffracts incident laser light such that the laser light forms the image, the interface device includes:

a plurality of the laser light application means, the respective laser light application means apply beams of laser light in directions different from each other and directions that pass through the same diffraction region, and the control means controls the laser light application means, and makes the laser light application means that apply the beams of laser light in directions indicated by the control information apply beams of laser light.

9. The interface device according to any one of 1. to 7., wherein the laser light application means has a plurality of laser light sources for applying beams of laser light having different colors, the control information indicates a color of laser light that the interface device is to apply, and the control means makes one or more laser light sources among the plurality of laser light sources apply beams of laser light such that laser light having the color that the control information indicates is applied from the laser light application means.

10. A control method that is executed by a computer for controlling an interface device, wherein the interface device includes:

a laser light application means having a laser light source for applying laser light; and a first light collection means, on which the laser light is incident, for diffracting the laser light such that the laser light forms an image that is not similar to that at the time of incidence, and the control method includes:

a control information acquisition step for acquiring control information that is information indicating each of a plurality of directions in which the image is to be irradiated; and a control step for controlling a direction in which the image is irradiated on the basis of the control information.

11. The control method according to 10., wherein the first light collection means has a plurality of diffraction regions that diffract the laser light such that the laser light forms the images that are independent on each other, the control information indicates the diffraction region on which the laser light is to be incident to indicate a direction in which the laser light is to be applied, and the control step controls a direction in which the laser light is applied such that the laser light is incident on the diffraction region indicated by the control information.

12. The control method according to 11., wherein the interface device includes a selection means including a plurality of apertures which perform filtering of a part of the laser light applied by the laser light application means, respectively, to emit beams of partial laser light, and in which the emitted beams of partial laser light are incident on the diffraction regions different from each other, the plurality of diffraction means diffract the incident beams of partial laser light, respectively, and the control step controls the selection means such that the beams of partial laser light are emitted with respect to the diffraction regions that the control information indicates.

13. The control method according to 12., wherein the interface device includes a division means for dividing the laser light applied by the laser light application means to form the plurality of beams of partial laser light and making the respective beams of partial laser light be incident on only the plurality of apertures.

14. The control method according to 12. or 13., wherein the first light collection means is position-variable, each of the plurality of diffraction regions has a plurality of partial regions on each of which the laser light is incident, the plurality of partial regions diffract the beams of partial laser light, respectively, such that the incident beams of laser light form different images, the control information further indicates a partial region to which the laser light is to be applied, the control method includes:

a partial laser light diffraction step in which the plurality of partial regions diffract the beams of partial laser light, respectively, and the control step controls the selection means and the first light collection means such that the laser light is incident on the partial region indicated by the control information.

15. The control method according to any one of 12. to 14, wherein the selection means has a second light collection means for, before the laser light applied from the laser light application means is incident on the diffraction means, reducing a diffusion angle of the laser light, and the first light collection means irradiates the image in a direction different from an incident direction.

16. The control method according to 10., wherein the first light collection means has at least one diffraction region that diffracts the laser light so as to form the image, the interface device includes:

a selection means having a plurality of apertures which perform filtering of a part of the laser light applied by the laser light application means to emit beams of partial laser light, respectively; and a direction change means that makes the beams of partial laser light emitted by the respective apertures be incident on the same diffraction region from directions different from each other, the control information indicates the apertures that are to emit the beams of partial laser light to indicate a direction in which the laser light is to be applied, and the control step controls the selection means such that the apertures indicated by the control information emit the beams of partial laser light.

17. The control method according to 10., wherein the first light collection means has at least one diffraction region that diffracts incident laser light such that the laser light forms the image, the interface device includes:

a plurality of the laser light application means, the respective laser light application means apply beams of laser light in directions different from each other and directions that pass through the same diffraction region, and the control step controls the laser light application means, and makes the laser light application means that apply the beams of laser light in directions indicated by the control information apply beams of laser light.

18. The control method according to any one of 10. to 17., wherein the laser light application means has a plurality of laser light sources for applying beams of laser light having different colors, the control information indicates a color of laser light that the interface device is to apply, and the control step makes one or more laser light sources among the plurality of laser light sources apply beams of laser light such that laser light having the color that the control information indicates is applied from the laser light application means.

This application is based upon and claims the benefit of priority from Japanese patent application No. 2013-041776, filed on Mar. 4, 2013, the disclosure of which is incorporated herein in its entirety by reference.

What is claimed is:

1. An interface device comprising:
a laser light application unit having a laser light source for applying laser light;
a control information acquisition unit that acquires control information indicating each of a plurality of directions in which an image is to be irradiated;
a control unit that controls a direction in which the image is irradiated on the basis of the control information; and
a first light collection unit, on which the laser light is incident, that diffracts the laser light such that the laser light forms the image that is not similar to that at the time of incidence.

2. The interface device according to claim 1, wherein
the first light collection unit has a plurality of diffraction regions that diffract the laser light such that the laser light forms the images that are independent on each other,
the control information indicates the diffraction region on which the laser light is to be incident to indicate a direction in which the laser light is to be applied, and
the control unit controls a direction in which the laser light is applied such that the laser light is incident on the diffraction region indicated by the control information.

3. The interface device according to claim 2, comprising:
a selection unit including a plurality of apertures which perform filtering of a part of the laser light applied by the laser light application unit, respectively, to emit beams of partial laser light, and in which the emitted beams of partial laser light are incident on the diffraction regions different from each other, wherein
the plurality of diffraction regions diffract the incident beams of partial laser light, respectively, and
the control unit controls the selection unit such that the beams of partial laser light are emitted with respect to the diffraction regions that the control information indicates.

4. The interface device according to claim 3, comprising:
a division unit that divides the laser light applied by the laser light application unit to form the plurality of beams of partial laser light and makes the respective beams of partial laser light be incident on only the plurality of apertures.

5. The interface device according to claim 3, wherein
the first light collection unit is position-variable,
each of the plurality of diffraction regions has a plurality of partial regions on each of which the laser light is incident, the plurality of partial regions diffract the beams of partial laser light, respectively, such that the incident beams of laser light form different images,
the control information further indicates a partial region to which the laser light is to be applied, and
the control unit controls the selection unit and the first light collection unit such that the laser light is incident on the partial region indicated by the control information.

6. The interface device according to claim 3 comprising:
a second light collection unit, before the laser light applied from the laser light application unit is incident on the diffraction region, that reduces a diffusion angle of the laser light, wherein
the first light collection unit irradiates the image in a direction different from an incident direction.

7. The interface device according to claim 1, wherein
the first light collection unit has at least one diffraction region that diffracts the laser light so as to form the image,
the interface device comprises:
a selection unit having a plurality of apertures which perform filtering of a part of the laser light applied by the laser light application unit to emit beams of partial laser light, respectively; and
a direction change unit that makes the beams of partial laser light emitted by the respective apertures be incident on the same diffraction region from directions different from each other,
the control information indicates the apertures that are to emit the beams of partial laser light to indicate a direction in which the laser light is to be applied, and
the control unit controls the selection unit such that the apertures indicated by the control information emit the beams of partial laser light.

8. The interface device according to claim 1, wherein
the first light collection unit has at least one diffraction region that diffracts incident laser light such that the laser light forms the image,
the interface device comprises:
a plurality of the laser light application units,
the respective laser light application units apply beams of laser light in directions different from each other and directions that pass through the same diffraction region, and
the control unit controls the laser light application unit, and makes the laser light application unit that apply the beams of laser light in directions indicated by the control information apply beams of laser light.

9. The interface device according to claim 1, wherein
the laser light application unit has a plurality of laser light sources for applying beams of laser light having different colors,
the control information indicates a color of laser light that the interface device is to apply, and
the control unit makes one or more laser light sources among the plurality of laser light sources apply beams of laser light such that laser light having the color that the control information indicates is applied from the laser light application unit.

10. A control method that is executed by a computer for controlling an interface device, wherein
the interface device comprises:
a laser light application unit having a laser light source for applying laser light; and a first light collection unit, on which the laser light is incident, that diffracts the laser light such that the laser light forms an image that is not similar to that at the time of incidence, and
the control method comprises:
acquiring control information indicating each of a plurality of directions in which the image is to be irradiated; and
controlling a direction in which the image is irradiated on the basis of the control information.

11. The control method according to claim 10, wherein
the first light collection unit has a plurality of diffraction regions that diffract the laser light such that the laser light forms the images that are independent on each other,
the control information indicates the diffraction region on which the laser light is to be incident to indicate a direction in which the laser light is to be applied, and
a direction in which the laser light is applied is controlled such that the laser light is incident on the diffraction region indicated by the control information.

12. The control method according to claim 11, wherein
the interface device comprises a selection unit including a plurality of apertures which perform filtering of a part of the laser light applied by the laser light application unit, respectively, to emit beams of partial laser light, and in which the emitted beams of partial laser light are incident on the diffraction regions different from each other,
the plurality of diffraction regions diffract the incident beams of partial laser light, respectively, and
the selection unit is controlled such that the beams of partial laser light are emitted with respect to the diffraction regions that the control information indicates.

13. The control method according to claim 12, wherein
the interface device comprises a division unit for dividing the laser light applied by the laser light application unit to form the plurality of beams of partial laser light and making the respective beams of partial laser light be incident on only the plurality of apertures.

14. The control method according to claim 12, wherein
the first light collection unit is position-variable,
each of the plurality of diffraction regions has a plurality of partial regions on each of which the laser light is incident,
the plurality of partial regions diffract the beams of partial laser light, respectively, such that the incident beams of laser light form different images,
the control information further indicates a partial region to which the laser light is to be applied,
the control method comprises:
diffracting the beams of partial laser light by the plurality of partial regions, respectively, and
the selection unit and the first light collection unit are controlled such that the laser light is incident on the partial region indicated by the control information.

15. The control method according to claim 12, wherein
the interface device comprises:
a second light collection unit, before the laser light applied from the laser light application unit is incident on the diffraction unit, that reduces a diffusion angle of the laser light, wherein
the first light collection unit irradiates the image in a direction different from an incident direction.

16. The control method according to claim 10, wherein
the first light collection unit has at least one diffraction region that diffracts the laser light so as to form the image,
the interface device comprises:
a selection unit having a plurality of apertures which perform filtering of a part of the laser light applied by the laser light application unit to emit beams of partial laser light, respectively; and
a direction change unit that makes the beams of partial laser light emitted by the respective apertures be incident on the same diffraction region from directions different from each other,
the control information indicates the apertures that are to emit the beams of partial laser light to indicate a direction in which the laser light is to be applied, and
the selection unit is controlled such that the apertures indicated by the control information emit the beams of partial laser light.

17. The control method according to claim 10, wherein
the first light collection unit has at least one diffraction region that diffracts incident laser light such that the laser light forms the image,
the interface device comprises:
a plurality of the laser light application units,
the respective laser light application unit apply beams of laser light in directions different from each other and directions that pass through the same diffraction region, and
the laser light application unit is controlled to apply the beams of laser light in directions indicated by the control information apply beams of laser light.

18. The control method according to claim 10, wherein
the laser light application unit has a plurality of laser light sources for applying beams of laser light having different colors,
the control information indicates a color of laser light that the interface device is to apply, and
one or more laser light sources among the plurality of laser light sources is controlled to apply beams of laser light such that laser light having the color that the control information indicates is applied from the laser light application unit.

* * * * *